US006983833B2

(12) United States Patent
Ivers et al.

(10) Patent No.: US 6,983,833 B2
(45) Date of Patent: Jan. 10, 2006

(54) SELF-TUNING VIBRATION ABSORBER SYSTEM AND METHOD OF ABSORBING VARYING FREQUENCY VEHICLE VIBRATIONS

(75) Inventors: Douglas E. Ivers, Cary, NC (US); Robert W. Wilson, II, Amherst, MA (US)

(73) Assignee: LORD Corporation, Cary, NC (US)

( * ) Notice: Subject to any disclaimer, the term of this patent is extended or adjusted under 35 U.S.C. 154(b) by 27 days.

(21) Appl. No.: 10/439,572

(22) Filed: May 16, 2003

(65) Prior Publication Data

US 2004/0108443 A1 Jun. 10, 2004

Related U.S. Application Data

(60) Provisional application No. 60/381,165, filed on May 16, 2002, provisional application No. 60/381,154, filed on May 16, 2002, provisional application No. 60/381,120, filed on May 16, 2002.

(51) Int. Cl.
*F16F 7/10* (2006.01)

(52) U.S. Cl. ........................................................ 188/379

(58) Field of Classification Search ................ 188/378, 188/379, 380

See application file for complete search history.

(56) References Cited

U.S. PATENT DOCUMENTS 2,838,137 A * 6/1958 Wallerstein, Jr. ............ 188/380
3,536,165 A * 10/1970 DesJardins .................. 188/380
3,876,040 A 4/1975 Yang
3,911,199 A 10/1975 Fischer
4,126,046 A 11/1978 Erdley
4,596,513 A 6/1986 Carlson et al.
4,857,791 A 8/1989 Uchino et al.
5,118,051 A 6/1992 Sheehy et al.
5,920,173 A 7/1999 Mercadal et al.
5,924,312 A 7/1999 Vande Haar
6,006,875 A 12/1999 Van Namen
6,116,389 A * 9/2000 Allaei ........................ 188/378
6,125,977 A * 10/2000 Nekomoto et al. ......... 188/378
6,129,177 A 10/2000 Gwinn
6,193,032 B1 2/2001 Lesieutre et al.
6,443,673 B1 9/2002 Etling et al.
6,666,108 B1 * 12/2003 Alleai ........................ 188/378

FOREIGN PATENT DOCUMENTS

GB 2189573 A 10/1987
WO WO 02/085705 A1 10/2002

* cited by examiner

*Primary Examiner*—Thomas Williams
(74) *Attorney, Agent, or Firm*—Edward F. Murphy, III

(57) ABSTRACT

A system and method for absorbing vehicle body vibrations is described. The mechanical self-tuning vibration absorber system is utilized to absorb a body vibration with a varying frequency. In a particular application the absorber system provides for absorbing varying frequency vibrations of a helicopter aircraft body. The vibration absorber system utilizes asymmetrical damping to tune the resonant frequency of the system.

42 Claims, 34 Drawing Sheets

SELF-TUNING VIBRATION ABSORBER SYSTEM AND METHOD OF ABSORBING VARYING FREQUENCY VEHICLE VIBRATIONS

CROSS-REFERENCE

This application claims the benefit of, and incorporates by reference, U.S. Provisional Patent Application Nos. 60/381,120; 60/381,154; and 60/381,165 each filed on May 16, 2002.

FIELD OF THE INVENTION

The present invention relates to a method/system for absorbing vibrations. More particularly the invention relates to a method and system for absorbing vehicle vibrations that have a varying frequency, and particularly to a mechanical self-tuning vibration absorber system for variable vibrating bodies.

BACKGROUND OF THE INVENTION

Tuned vibration absorbers (TVAs) are very useful devices which can cancel the motion at their attachment points at a specific frequency. Unfortunately, TVAs only work at one vibration frequency while the items that they are attached to might vibrate over a range of frequencies. This varying frequency range could be due to a change in the natural frequency of a system, or the operating range of the system could include a range of vibratory frequencies over which isolation is needed. Thus, it is very desirable to have a TVA that will automatically tune itself to the frequency of vibration of the system to which it is attached. In recent years, many types of adaptive TVAs have been proposed and implemented in engineering applications. Adaptive TVAs (non-passive TVAs) can be divided into categories. There are semi-active TVAs, active TVAs (ATVAs) and self-tuning vibration absorbers (STVAs). Semi-active TVAs require power external to the vibration in order to adjust the inertial or compliant characteristics of the TVA through some mechanism. ATVAs also require power external to the vibration, but use this power to directly apply a force on the TVA system. Most ATVAs apply a force directly to the TVA mass. Both semi-active and active TVAs require control logic in order to tune the TVA. The complexity of this logic has included methods from classical controls to fuzzy logic and neural networks. The third type of Adaptive TVAs, STVAs, rely completely on the vibration itself for tuning. No external power is required for these devices, and often, no control logic is needed either. The STVA finds the frequency of the input vibration and tunes itself to it.

There is a need for a system and method of accurately and economically absorbing vehicle body vibrations with a varying frequency. There is a need for an economically feasible method of absorbing vibrations with a varying frequency. There is a need for a robust system and method of making mechanical self-tuning vibration absorbers. There is a need for an economic mechanical self-tuning vibration absorber device and method for absorbing vibrations in a varying frequency range.

SUMMARY OF THE INVENTION

The invention includes a mechanical self-tuning vibration absorber system for a variable vibrating vehicle body having a body vibration with a varying frequency (VFBV)(Variable Frequency Body Vibration). The mechanical self-tuning vibration absorber system is attached to the variable vibrating body to absorb the body's vibrations. The mechanical self-tuning vibration absorber system has a first absorber unit with a first damping ratio and a second absorber unit with a second damping ratio. The second absorber second damping ratio is different from the first absorber first damping ratio. The first absorber unit is connected to the second absorber unit wherein the connected first absorber unit and the second absorber unit mechanically walk in a first tuning direction to a low tuned position when the variable vibrating body vibration varying frequency changes to a lower frequency and in a second tuning opposing direction to a high tuned position when the variable vibrating body vibration varying frequency changes to a higher frequency. The resonate motion of connected first absorber unit and the second absorber unit at the tuned position absorbs and cancels the vibrations of body.

The invention includes a method of absorbing vibrations. The method includes providing a variable vibrating body having a body vibration with a varying frequency (VFBV, Variable Frequency Body Vibration), providing a mechanical self-tuning vibration absorber system with a mechanical self-tuning vibration absorber system base and a mechanical vibration absorber system longitudinal track. The mechanical self-tuning vibration absorber system includes a first absorber unit with a first damping ratio and a second absorber unit with a second damping ratio, the second absorber second damping ratio different from the first absorber first damping ratio, the first absorber unit mechanically connected to the second absorber unit. The connected first absorber unit and the second absorber unit are movably connected to the mechanical vibration absorber system longitudinal track. The method includes attaching the mechanical self-tuning vibration absorber system to the provided body wherein the connected first absorber unit and the second absorber unit mechanically walk in a first tuning direction to a low tuned position when the variable vibrating body vibration varying frequency changes to a lower frequency and in a second tuning opposing direction to a high tuned position when the variable vibrating body vibration varying frequency changes to a higher frequency. The resonant frequency of the connected first absorber unit and the second absorber unit at tuned position absorbs the vibrations of the body.

The invention includes a method of making a mechanical self-tuning vibration absorber system. The method includes providing a mechanical vibration absorber system longitudinal track, providing a first absorber unit with a first damping ratio and a second absorber unit with a second damping ratio, the second absorber second damping ratio different from the first absorber first damping ratio, the first absorber unit connected to the second absorber unit. The method includes movably mounting the first absorber unit and the second absorber unit to the mechanical vibration absorber system longitudinal track, wherein the connected first absorber unit and the second absorber unit mechanically walk in a first tuning direction to a low tuned position when excited by a variable vibrating body vibration varying frequency which changes to a lower frequency and in a second tuning opposing direction to a high tuned position when excited by a variable vibrating body vibration varying frequency which changes to a higher frequency.

The invention includes a method of tracking the vibration frequency of a vibrating body. The method includes providing a mechanical self-tuning vibration absorber system, the mechanical self-tuning vibration absorber system having a first absorber unit with a first damping ratio and a second absorber unit with a second damping ratio, the second absorber second damping ratio different from the first absorber first damping ratio. The first absorber unit is connected to the second absorber unit wherein the connected first absorber unit and the second absorber unit mechanically walk in a first tuning direction to a low tuned position when excited by a variable vibrating body vibration varying frequency changing to a lower frequency and in a second tuning opposing direction to a high tuned position when exposed to a variable vibrating body vibration varying frequency changing to a higher frequency. The method includes attaching the mechanical self-tuning vibration absorber system to a variable vibrating body and monitoring a position of the connected first absorber unit and the second absorber.

The invention includes a vehicle comprised of a variable vibrating body, the body having a body vibration with a varying frequency (VFBV)(Variable Frequency Body Vibration). The vehicle body includes a mechanical self-tuning vibration absorber system having a first absorber unit with a first damping ratio and a second absorber unit with a second damping ratio, the second absorber second damping ratio different from the first absorber first damping ratio. The first absorber unit is connected to the second absorber unit wherein the connected first absorber unit and the second absorber unit mechanically walk in a first tuning direction to a low tuned position when the variable vibrating body vibration varying frequency changes to a lower frequency and in a second tuning opposing direction to a high tuned position when the variable vibrating body vibration varying frequency changes to a higher frequency. The motion of the connected first absorber unit and the second absorber unit at the tuned position absorbs and cancels vehicle vibrations.

The invention includes a helicopter comprised of a variable vibrating body having a body vibration with a varying frequency (VFBV)(Variable Frequency Body Vibration). The helicopter body includes a mechanical self-tuning vibration absorber system having a longitudinal track and a first absorber unit with a first damping ratio and a second absorber unit with a second damping ratio, the second absorber second damping ratio different from the first absorber first damping ratio, the first absorber unit connected to the second absorber unit wherein the connected first absorber unit and the second absorber unit mechanically walk along the longitudinal track in a first tuning direction to a low tuned position when the variable vibrating body vibration varying frequency changes to a lower frequency and in a second tuning opposing direction to a high tuned position when the variable vibrating body vibration varying frequency changes to a higher frequency.

The invention includes a method of absorbing vehicle vibrations. The method includes providing a variable vibrating vehicle body having a body vibration with a varying frequency, the varying frequency preferably in the range of 1–1,000 Hz. The method includes providing a mechanical self-tuning vibration absorber system with a mechanical self-tuning vibration absorber system base and a mechanical vibration absorber system longitudinal track, the mechanical self-tuning vibration absorber system including a first absorber unit with a first damping ratio and a second absorber unit with a second damping ratio, the second absorber second damping ratio different from the first absorber first damping ratio, the first absorber unit mechanically connected to the second absorber unit , the connected first absorber unit and the second absorber unit movably connected to the mechanical vibration absorber system longitudinal track. The method includes attaching the mechanical self-tuning vibration absorber system to the provided vehicle body wherein the connected first absorber unit and the second absorber unit mechanically walk along the longitudinal track in a first tuning direction to a low tuned position when the variable vibrating body vibration varying frequency changes to a lower frequency and in a second tuning opposing direction to a high tuned position when the variable vibrating body vibration varying frequency changes to a higher frequency. The connected first absorber unit and the second absorber unit absorb the body vibration at the walked to tuned position.

The invention includes a mechanical self-tuning vibration absorber, the mechanical self-tuning vibration absorber for attachment to a vibrating body, the mechanical self-tuning vibration absorber having a damped first absorber unit with a first damping ratio and an undamped second absorber unit with a second damping ratio, the undamped second absorber second damping ratio different from the damped first absorber first damping ratio, the damped first absorber unit connected to the undamped second absorber unit wherein the connected damped first absorber unit and the undamped second absorber unit mechanically walk in a first tuning direction to a low tuned position and in a second tuning direction to a high tuned position.

The invention includes a method of absorbing vibrations, the method comprising the steps of providing a body having a body vibration, providing a mechanical self-tuning vibration absorber with a mechanical vibration absorber longitudinal track, the mechanical self-tuning vibration absorber including a first absorber unit with a first damping ratio and a second absorber unit with a second damping ratio, the second absorber second damping ratio different from the first absorber first damping ratio, the first absorber unit mechanically connected to the second absorber unit, the connected first absorber unit and the second absorber unit movably connected to the mechanical vibration absorber longitudinal track, attaching the mechanical self-tuning vibration absorber to the provided body wherein the connected first absorber unit and the second absorber unit mechanically walk in a first tuning direction to a low tuned position and in a second tuning direction to a high tuned position.

The invention includes a vehicle, the vehicle comprised of a vibrating body, the body having a body vibration with a frequency, the body including a mechanical self-tuning vibration absorber having a first absorber unit with a first damping ratio and a second absorber unit with a second damping ratio, the second absorber second damping ratio different from the first absorber first damping ratio, the first absorber unit connected to the second absorber unit wherein the connected first absorber unit and the second absorber unit mechanically walk in a first tuning direction to a low tuned position and in a second tuning direction to a high tuned position.

The invention includes a helicopter, the helicopter including a mechanical self-tuning vibration absorber having a longitudinal track and a damped first absorber unit and an undamped second absorber unit, the damped first absorber unit connected to the undamped second absorber unit wherein the connected damped first absorber unit and the undamped second absorber unit mechanically walk along the longitudinal track in a first tuning direction to a low tuned position and in an opposing second tuning direction to a high tuned position.

The invention includes a method of absorbing vehicle vibrations, the method comprising the steps of providing a vibrating vehicle body, providing a mechanical self-tuning vibration absorber with a mechanical vibration absorber longitudinal track, the mechanical self-tuning vibration absorber including a damped absorber unit and an undamped absorber unit, the damped absorber unit connected to the undamped absorber unit, the connected damped absorber unit and the undamped absorber unit connected to the mechanical vibration absorber longitudinal track, attaching the mechanical self-tuning vibration absorber to the provided vehicle body wherein the connected damped absorber unit and the undamped absorber unit walk along the longitudinal track in a first tuning direction to a low tuned position and in an opposing second tuning direction to a high tuned position.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

DETAILED DESCRIPTION OF THE PREFERRED EMBODIMENT

Figure 1A:
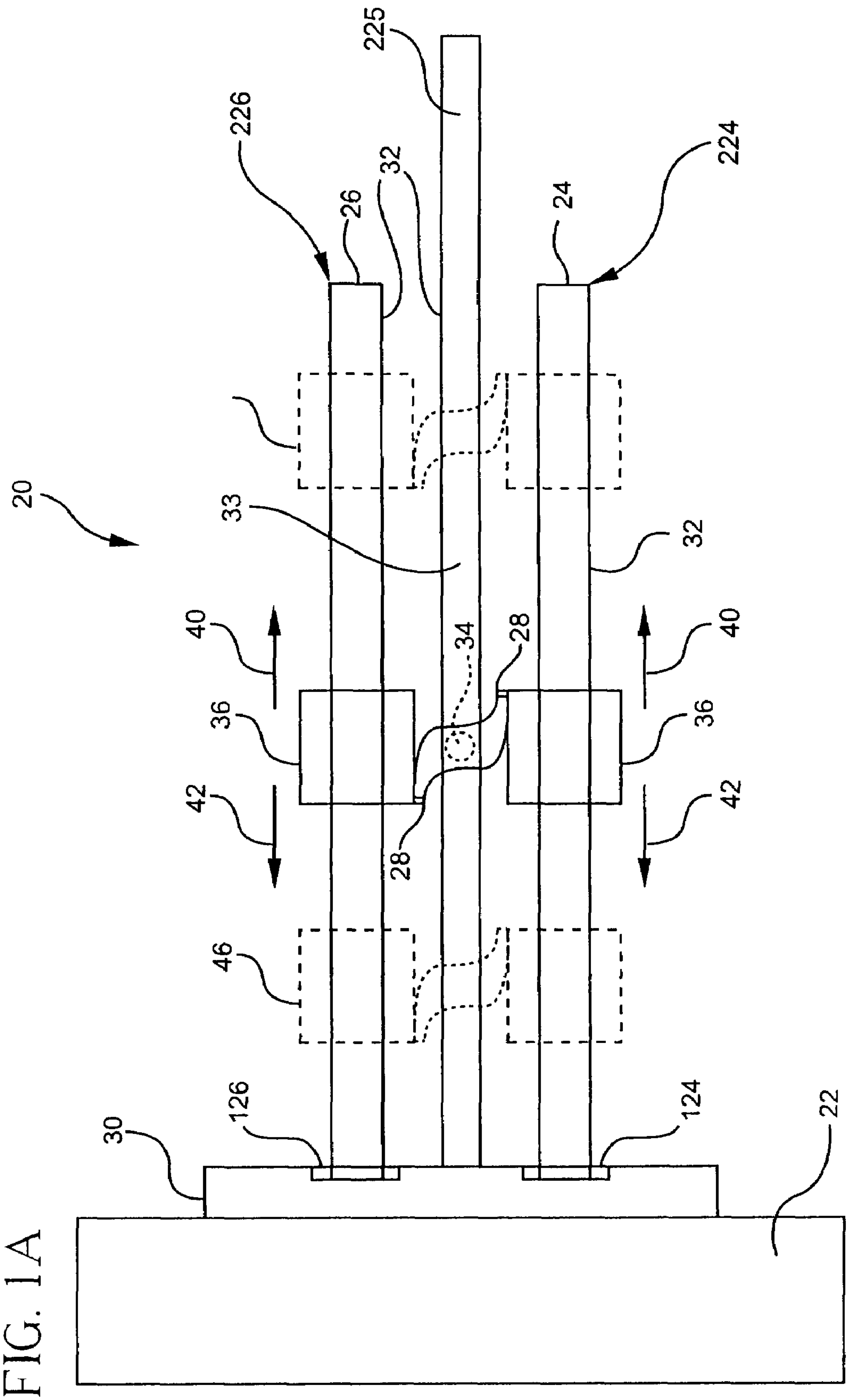
FIGS. 1A–E shows an embodiment of the invention.
Figure 1B:
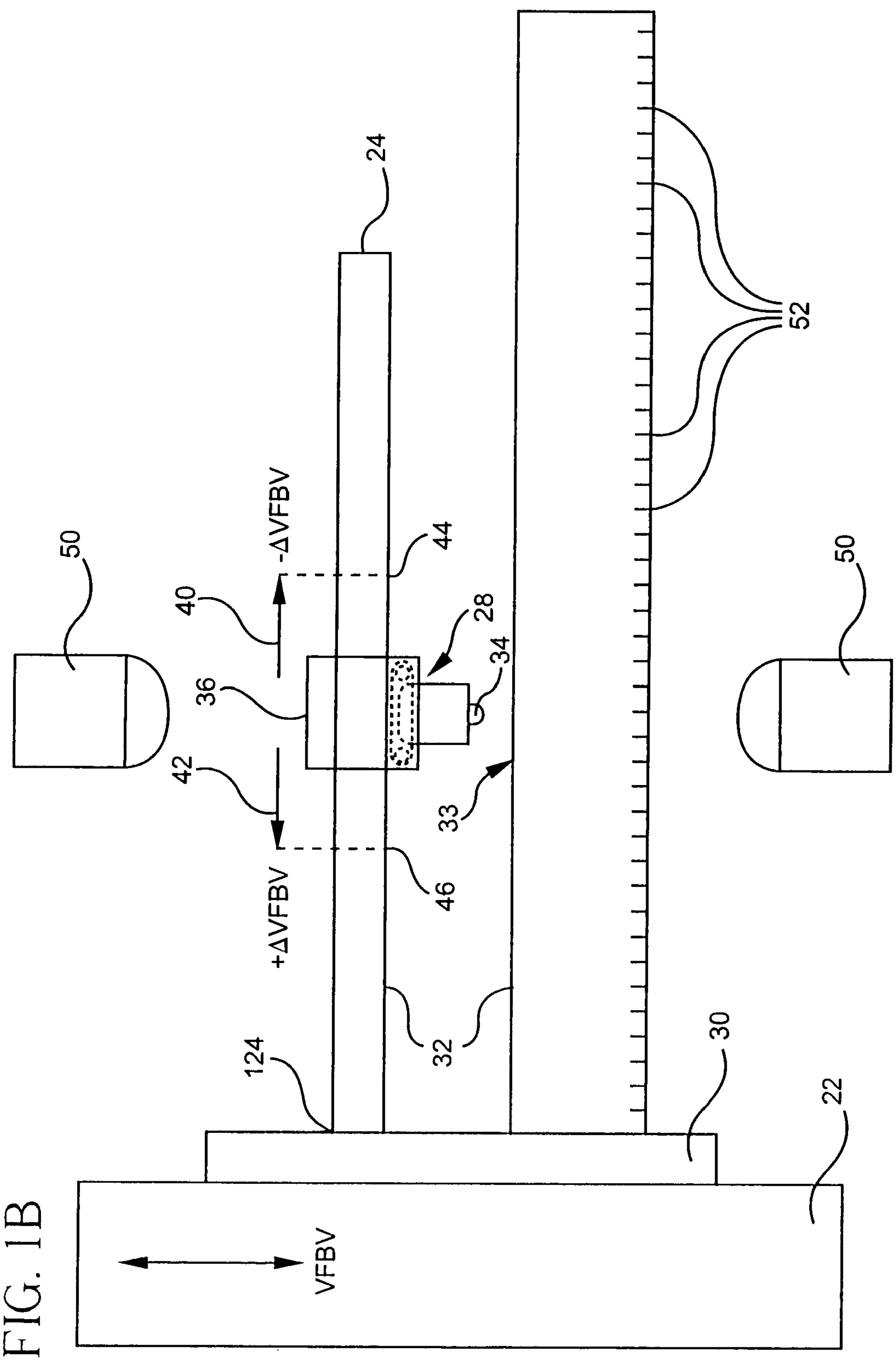
Figure 1C:
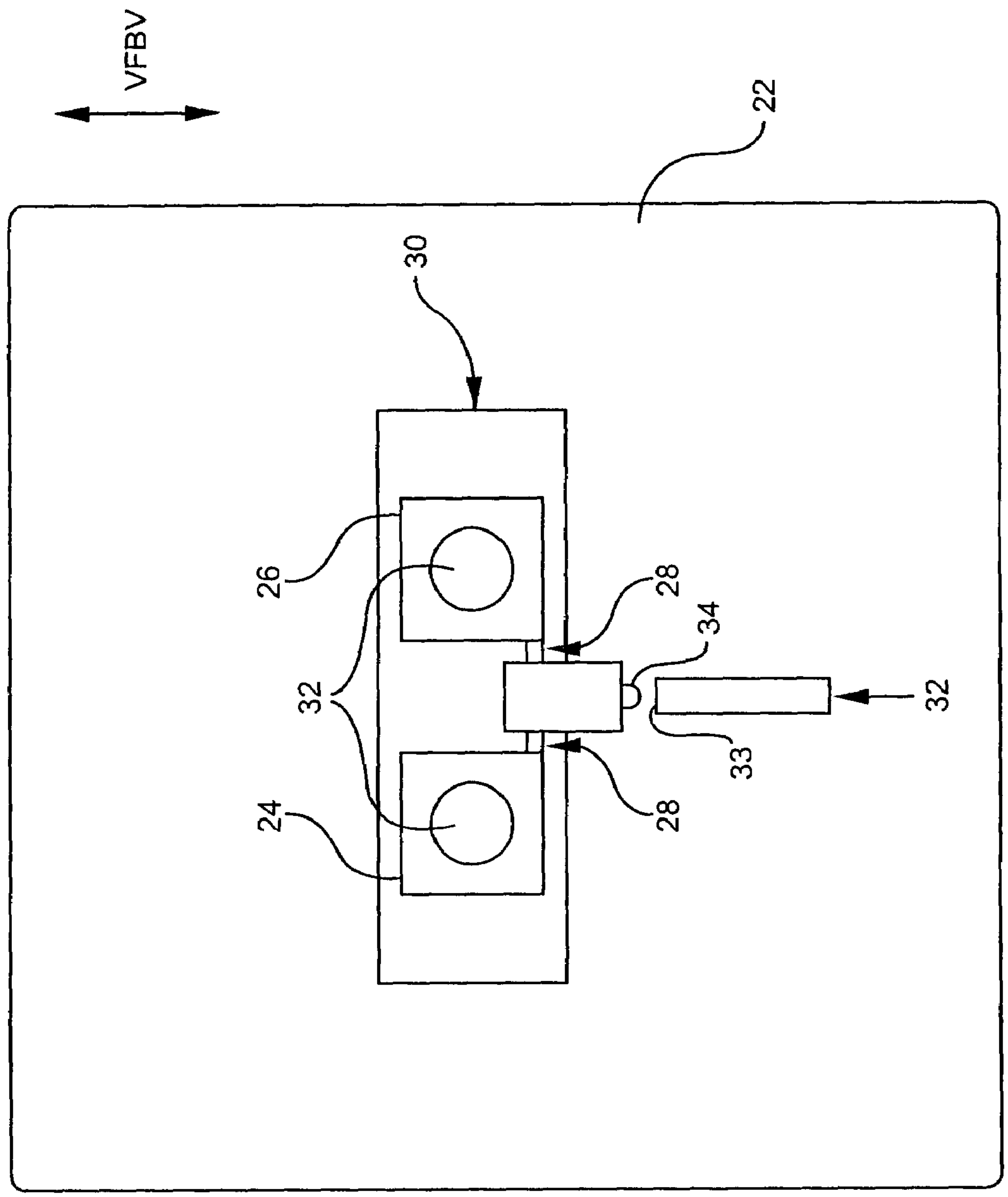

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings. The invention includes a mechanical self-tuning vibration absorber system for a variable vibrating body having a body vibration with a varying frequency VFBV (Variable Frequency Body Vibration). Preferably the varying frequency ranges from 1–1,000 Hz, more preferably 10–1,000 Hz, more preferably 10–999 Hz, more preferably 11–999 Hz. As shown in FIG. 1, mechanical self-tuning vibration absorber system 20 is attached to variable vibrating body 22. The mechanical self-tuning vibration absorber system has a first absorber unit 24. First absorber unit 24 is a damped absorber with a first damping ratio. The absorber system 20 has a second absorber unit 26. Second absorber unit 26 is a preferably relatively undamped absorber with a second damping ratio. The relatively damped first absorber unit 24 is a sprung solid mass 36 that is sprung with some damping as with an electrometric spring. Damped first absorber unit 24 as shown is FIG. 1 is a first solid mass 36 on a track 32 beam sprung with a damped spring element 124, such as an elastomeric spring element. The relatively undamped second absorber unit 26 is a sprung solid mass 36 that is sprung with no damping or minimal damping compared to damped absorber 24. Un-damped second absorber unit 26 as shown in FIG. 1 is a second solid mass 36 on a track 32 beam sprung with an undamped spring element 126, such as an undamped metal spring. Second absorber unit 26 is relatively undamped compared to first absorber unit 24 which is intentionally damped, such that the first damping ratio of absorber unit 24 is greater than the second damping ratio of absorber unit 26. Preferably one absorber unit is a non-fluid solid mass 36 sprung with relatively low damping such as with an undamped spring 126 and the other absorber unit is a non-fluid solid mass 36 sprung with some damping (relatively high damping) such as with a damped spring 124. Undamped second absorber unit 26 is very low damped compared to absorber unit 24, such as being sprung with a lightly damped spring, such as with a metal spring, for example with spring nature of its track beam 32 itself or an undamped spring plate element 126 for example a trunnion plate. Damped first absorber unit 24 is damped as with an elastomeric spring, such as with a damped rubber bushing for damped spring element 124 at the base of its track beam 32. The absorber units are damped and undamped (two different damping ratios) such as to provide an asymmetrical damping for the absorber system 20 when linked together. The first absorber unit 24 is connected with a connection 28 to second absorber unit 26. Mechanical connection 28 can be a rigid physical connection or a flexible physical connection. As shown in FIG. 1, connection 28 is pivotally connecting solid mass 36 of undamped absorber unit 26 with solid mass 36 of damped absorber unit 24. A shown in FIGS. 1A–E, asymmetrically damped absorber system 20 has first absorber unit 24 mechanically connected with second absorber unit 26 wherein the first and second absorber units mechanically walk in a first tuning direction 40 to a low tuned position 44 when the variable vibrating body vibration varying frequency (VFBV) changes to a lower frequency (−ΔVFBV) and in a second tuning opposing direction 42 to a high tuned position 46 when the variable vibrating body vibration (VFBV) changes to a higher frequency (+ΔVFBV). The natural resonant frequency resonant motion of the connected first absorber unit and second absorber unit at low tuned position 44 absorbs and cancels the changed to lower frequency of the vibrating body 22. The natural resonant frequency resonant motion of the connected first absorber unit and second absorber unit at high tuned position 46 as the longitudinal track beams 32 absorbs and cancels the changed to higher frequency of the vibrating body 22.

Figure 1D:
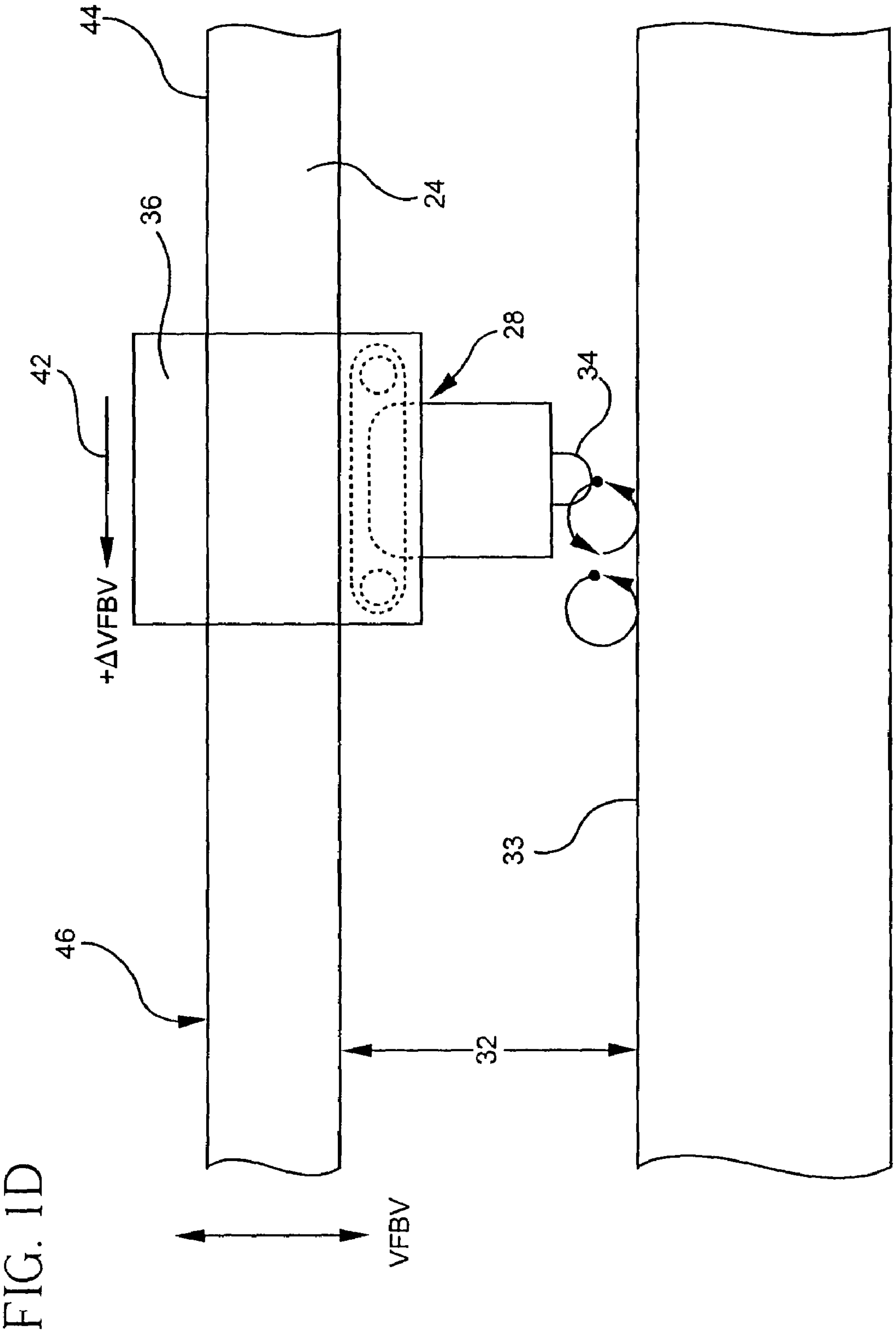
Figure 1E:
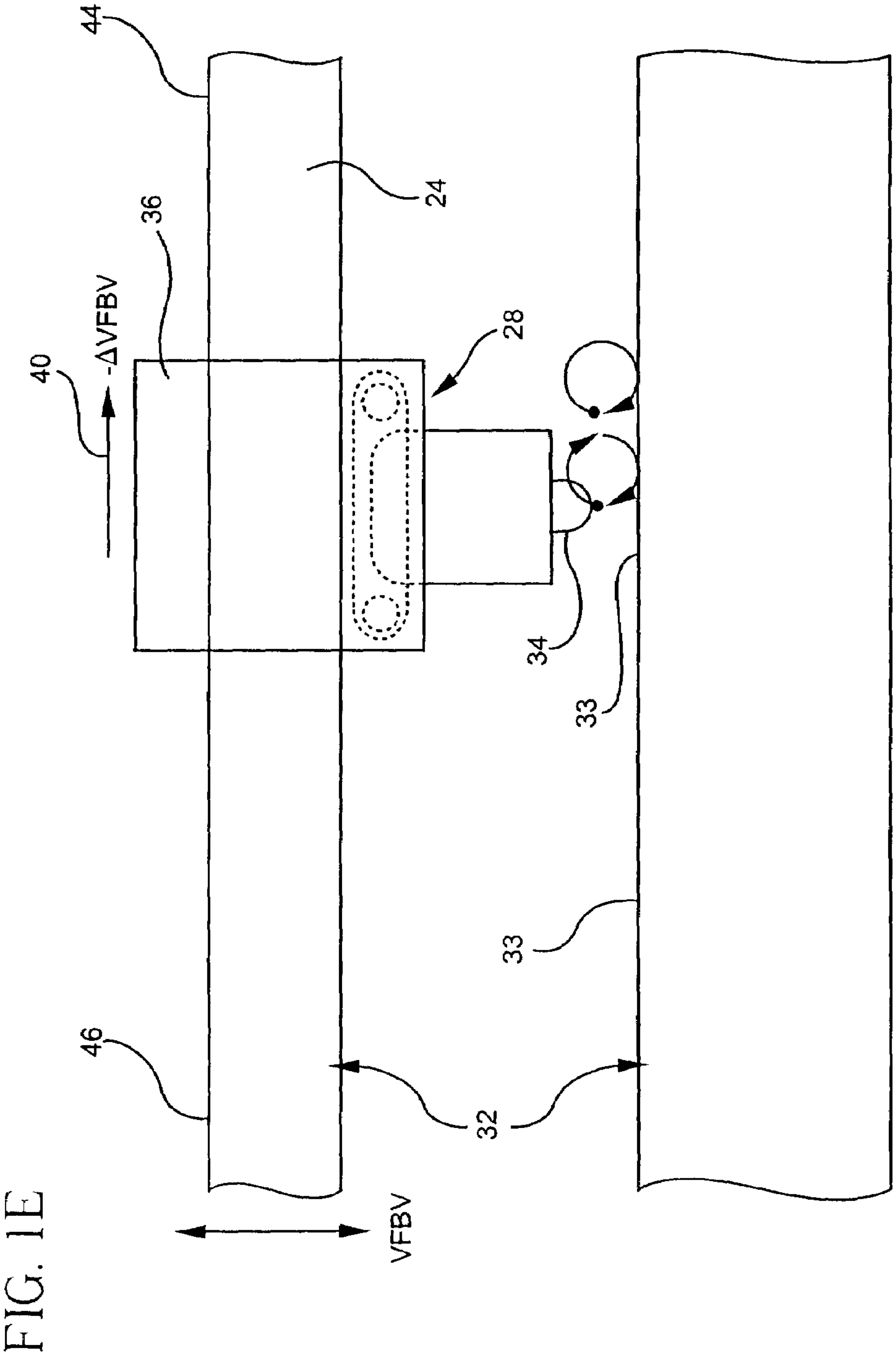
Figure 2A:
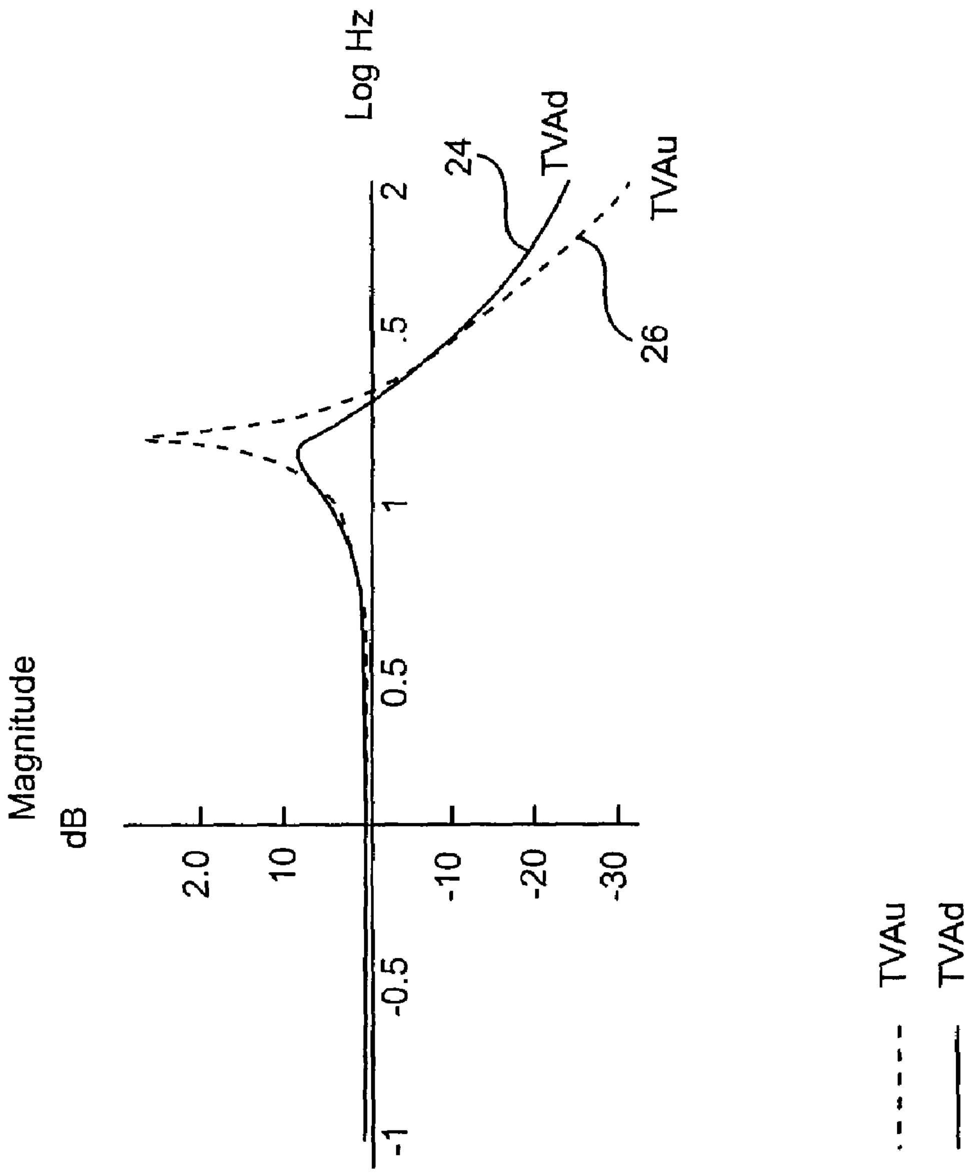
FIGS. 2A–B shows an embodiment of the invention.
Figure 2B:
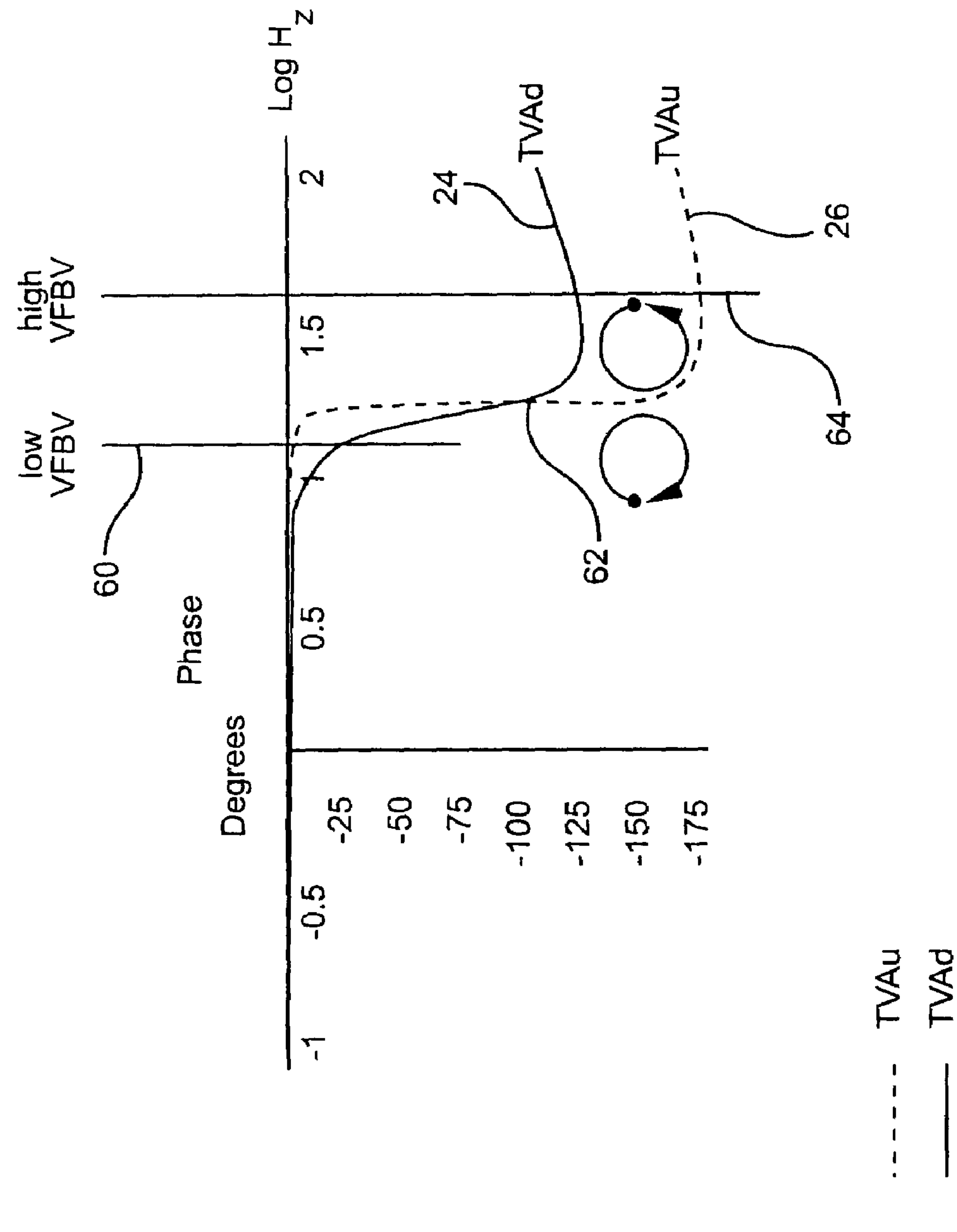

Preferably the absorber system 20 is attached to variable vibrating body 22 with a mechanical self-tuning vibration absorber system base 30. Preferably the absorber system 20 includes a longitudinal beam track 32 along which the connected absorber units walk. Preferably the longitudinal walking track 32 is secured proximate to the vibration system base 30 and vibrating body 22. Preferably the first tuning direction 40 is away from base 30 and the second tuning direction 42 is towards base 30. Preferably longitudinal track 32 is a plurality of tracks 32 that form a track system that provide a guided longitudinal walking path for connected absorber units 24 and 26. Preferably the longitudinal track 32 are comprised of cantilevered beams, preferably with an undamped cantilevered vibrating beam 226 and a damped cantilevered vibrating beam 224 as shown in FIG. 1. As shown in FIG. 1, longitudinal track 32 preferably includes a separate walking beam track 225 that provides a track walking surface 33 for walking interaction with the friction interaction surface 34 of the absorber units. Preferably the separate walking beam track 225 with surface 33 is separately rigidly attached to base 30 and/or body 22. As shown in FIG. 1, with mechanical self-tuning vibration absorber system 20 an interaction between the first absorber unit 24 and second absorber unit 26 relative to the lower frequency and the difference between the damping ratios drives the connected first absorber unit and the second absorber unit away from base 30. Similarly an interaction between first absorber unit 24 and second absorber unit 26 relative to the higher frequency and the difference between the damping ratios drives the connected absorber units toward base 30. The first absorber unit 24 resonant frequency is within the range of the body vibration varying frequency. The second absorber unit 26 resonant frequency is within the range of the body vibration varying frequency. Preferably the connected first absorber unit and second absorber unit has a friction interaction surface 34 for movably contacting the longitudinal track walking surface 33 with walking steps. The friction interaction surface 34 contacts the walking surface 33 of track 32 in steps and thus walks by repeated periodic frictional engagement along the longitudinal track. FIG. 2 shows how the mechanical self-tuning vibration absorber system utilizes the asymmetrical damping from the damped first absorber unit 24 and the undamped second absorber unit 26 to mechanically walk to tuned position when the varying frequency body vibration (VFBV) changes. FIG. 2 shows base excited frequency response of two sprung solid mass resonant systems (TVAs, Tuned Vibration Absorber units) which have different levels of damping, two relatively different damping ratios. The dashed line TVAu, signifies relatively undamped second absorber unit 26 with the very low second damping ratio. The solid line TVAd signifies relatively damped first absorber unit 24 with the high first damping ratio. FIG. 2 shows the magnitude and phase of the undamped second absorber unit (TVAu-Tuned Vibration Absorber undamped) and the damped first absorber unit (TVAd-Tuned Vibration Absorber damped). Below the resonance of undamped second absorber unit 26, the sprung solid mass 36 of damped first absorber unit 24 lags the input (body vibrations VFBV) more than the sprung solid mass 36 of undamped second absorber unit 26 lags the input body vibration. That is that the solid mass of damped first absorber unit 24 lags the mass at undamped second absorber unit 26. Above the resonance the reverse occurs, the undamped sprung solid mass of second absorber unit 26 lags the damped sprung solid mass of first absorber unit 24. This asymmetrical damping interaction physics between two different damping levels of the two tuned vibration absorber units drives the mechanical walking of the solid mass and the mechanical self-tuning of the system. The phase difference between the first and second damping ratios drives the walking motion and converts the vibration energy of the vibrating body 22 into movement along longitudinal beam track 32. The two relatively different resonant responses (damped and undamped) drives the self-tuning of the system which provides an isolated self-tuning vibration absorber system in that no outside power or information is used or needed other than the body vibration itself which is being absorbed. As shown in FIG. 1E and FIG. 2B, if the varying frequency body vibration changes to a lower frequency, such as low disturbance frequency 60 (FIG. 2B) undamped (TVAu) absorber unit 26 (dashed line) leads so friction interaction surface 34 orbits in a clockwise motion and movably contacts and frictionally engages track walking surface 33 and walks the connected absorber units toward low tuned position 44 (away from base) until the point 62(intersection of dashed and undashed lines) coincides with the base vibration 60 where the whirling orbital clockwise motion collapses to a linear non-orbital motion and the walking stops. As shown in FIG. 1D and FIG. 2B, if the varying frequency body vibration changes to a higher frequency, such as high disturbance frequency 64 (FIG. 2B) undamped (TVAu) absorber unit 26 (dashed line) follows so friction interaction surface 34 orbits in a counter clockwise motion and movably contacts and frictionally engages track walking surface 33 and walks towards the base until intersection point 62 coincides with the base vibration frequency 64 where the whirling orbital counter clockwise motion collapses to a linear non-orbital motion and the walking stops. The asymmetrical damping phase difference interaction between the absorber units relative to the lower frequency drives the connected absorber units away from base 30. The asymmetrical damping phase difference interaction between the absorber units relative to the higher frequency drives the connected absorber units towards base 30. The first absorber unit 24 has a resonant response frequency within the range of the body vibration varying frequency. The second absorber unit 26 has a resonant response frequency within the range of the body vibration varying frequency. The connected absorber units 24 and 26 are comprised of friction interface surface 34 which movably contacts walking surface 33 of longitudinal track system 32 in steps to walk the connected absorber units in the correct direction to the appropriate tuned position. In an embodiment friction interface surface 34 is part of connection 28 connecting the absorber units. In an embodiment friction interface surface is part of a solid mass or some attachment thereto.

The invention includes a method of absorbing vibrations. The method includes providing a variable vibrating body having a body vibration with a varying frequency (VFBV, Variable Frequency Body Vibration), providing a mechanical self-tuning vibration absorber system with a mechanical self-tuning vibration absorber system base and a mechanical vibration absorber system longitudinal track. The mechanical self-tuning vibration absorber system includes a first absorber unit with a first damping ratio and a second absorber unit with a second damping ratio, the second absorber second damping ratio different from the first absorber first damping ratio, the first absorber unit mechanically connected to the second absorber unit. The connected first absorber unit and the second absorber unit are movably connected to the mechanical vibration absorber system longitudinal track. The method includes attaching the mechanical self-tuning vibration absorber system to the provided body wherein the connected first absorber unit and the second absorber unit mechanically walk in a first tuning direction to a low tuned position when the variable vibrating body vibration varying frequency changes to a lower frequency and in a second tuning opposing direction to a high tuned position when the variable vibrating body vibration varying frequency changes to a higher frequency. The resonant frequency of the connected first absorber unit and the second absorber unit at tuned position absorbs the vibrations of the body.

The method of absorbing vibrations includes providing a variable vibrating vehicle body 22 having a body vibration with a varying frequency VFBV (Variable Frequency Body Vibration), preferably with the varying frequency in the range of 10–1,000 Hz. In an embodiment the varying frequency is in the range of 10–30 Hz. In an embodiment the varying frequency is in the range of 60–300 Hz. The method includes providing mechanical self-tuning vibration absorber system 20 with a mechanical self-tuning vibration absorber system base 30 and a mechanical vibration absorber system longitudinal track system 32. The mechanical self-tuning vibration absorber system 20 includes a first absorber unit 24 with a first sprung solid nonfluid mass. First absorber unit 24 has a first damping ratio. The mechanical self-tuning vibration absorber system 20 includes a second absorber unit 26 with a with a first sprung solid nonfluid mass and has a second damping ratio with the second absorber second damping ratio different from the first absorber first damping ratio. The first absorber unit 24 is mechanically connected to the second absorber unit 26. The connected first absorber unit and the second absorber unit are movably connected to the mechanical vibration absorber system longitudinal tracks 32. The mechanical self-tuning vibration absorber system 20 is attached to the provided body 22 wherein the connected first absorber unit 24 and the second absorber unit 26 mechanically walk the masses on beam tracks 32 in a first tuning direction 40 to a low tuned position 44 when the variable vibrating body vibration varying frequency VFBV changes to a lower frequency and in a second tuning opposing direction 42 to a high tuned position 46 when the variable vibrating body vibration varying frequency VFBV changes to a higher frequency. The resonant motion of the connected first absorber unit and the second absorber unit at the tuned position absorbs and cancels the vibrations of body 22. In a preferred embodiment the first damping ratio is greater than the second damping ratio, preferably with one spring solid mass 36 having low damping and the other spring mass 36 having some damping. Preferably the mechanical vibration absorber longitudinal track system 32 is secured proximate to the mechanical self-tuning vibration absorber system base 30 and attaching the mechanical self-tuning vibration absorber system 20 to the provided body 22 includes attaching the mechanical self-tuning vibration absorber system base to the provided body with the first tuning direction 40 away from the base 30 and along the longitudinal track 32 and the second tuning direction 42 is towards the base 30 along the longitudinal track 32. The asymmetrical damping phase difference interaction between the first absorber unit and the second absorber unit relative to the lower frequency drives the connected first absorber unit and the second absorber unit away from the base. The asymmetrical damping phase difference interaction between the first absorber unit and the second absorber unit relative to the higher frequency drives the connected first absorber unit and the second absorber unit towards the base. The phase difference from the different damping level ratios drives the tuning motion and direction, with the vibration energy of body 22 converted to movement along track beams 32. The method uses the two responses of the two absorber units to drive the tuning process with isolated system 20 isolated from outside power and information. The difference between the first damping ratio and the second damping ratio provides for the mechanical self-tuning of the vibration absorber system to absorb and cancel the vibrations. Preferably the first absorber unit 24 has a resonance response frequency within the range of the body vibration varying frequency. Preferably the second absorber unit 26 has a resonance response frequency within the range of the body vibration varying frequency. Preferably the connected first absorber unit 24 and the second absorber unit 26 include a friction interaction surface 34, with the friction interaction surface 34 movably contacting the track walking surface 33 with walking interaction steps so that the connected absorber units walk by repeated periodic frictional engagement of the track.

The invention includes a method of making a mechanical self-tuning vibration absorber system. The method includes providing a mechanical vibration absorber system longitudinal track, providing a first absorber unit with a first damping ratio and a second absorber unit with a second damping ratio, the second absorber second damping ratio different from the first absorber first damping ratio, the first absorber unit connected to the second absorber unit. The method includes movably mounting the first absorber unit and the second absorber unit to the mechanical vibration absorber system longitudinal track, wherein the connected first absorber unit and the second absorber unit mechanically walk in a first tuning direction to a low tuned position when excited by a variable vibrating body vibration varying frequency which changes to a lower frequency and in a second tuning opposing direction to a high tuned position when excited by a variable vibrating body vibration varying frequency which changes to a higher frequency.

The method includes making a mechanical self-tuning vibration absorber system 20. The method includes providing a mechanical vibration absorber system longitudinal track 32. The method includes providing a first absorber unit 24 with a first damping ratio and a second absorber unit 26 having a second damping ratio with the second absorber second damping ratio different from the first absorber first damping ratio. The first absorber unit 24 is mechanically connected to the second absorber unit 26. The first absorber unit and the second absorber unit are movably mounted to the mechanical vibration absorber system longitudinal track 32, wherein the connected first absorber unit 24 and the second absorber unit 26 mechanically walk in a first tuning direction 40 to a low tuned position 44 when excited by a variable vibrating body vibration varying frequency which changes to a lower frequency and in a second tuning opposing direction 42 to a high tuned position 46 when excited by a variable vibrating body vibration varying frequency which changes to a higher frequency. The resonant motion of the connected first absorber unit and the second absorber unit at the tuned position absorbs and cancels vibrations of the body that it is attached to. Preferably the first damping ratio is greater than the second damping ratio. Preferably the method includes providing a mechanical vibration absorber system base 30, securing the mechanical vibration absorber system longitudinal tracks 32 to the mechanical self-tuning vibration absorber system base 30 wherein the first tuning direction 40 is away from the base 30 and along the longitudinal track 32 and the second tuning direction 42 is toward the base 30 along the longitudinal track 32. Preferably an asymmetrical damping phase difference interaction between the first absorber unit 24 and the second absorber unit 26 relative to the vibration frequency drives the connected first absorber unit and the second absorber unit in the tuning direction to the tuned position. The first absorber unit and the second absorber unit have resonance relative frequency within the range of the body vibration varying frequency and the second absorber unit (second sprung solid mass) have resonance response frequencies within the range of the body vibration varying frequency. The connected first absorber unit 24 and the second absorber unit 26 include a friction interaction surface 34. The friction interaction surface 34 movably contacts the track with a walking interaction.

The invention includes a method of tracking the vibration frequency of a vibrating vehicle body. The method includes measuring and monitoring the changing vibration frequency. The method includes providing a mechanical self-tuning vibration absorber system, the mechanical self-tuning vibration absorber system having a first absorber unit with a first damping ratio and a second absorber unit with a second damping ratio, the second absorber second damping ratio different from the first absorber first damping ratio. The first absorber unit is connected to the second absorber unit wherein the connected first absorber unit and the second absorber unit mechanically walk in a first tuning direction to a low tuned position when excited by a variable vibrating body vibration varying frequency changing to a lower frequency and in a second tuning opposing direction to a high tuned position when exposed to a variable vibrating body vibration varying frequency changing to a higher frequency. The method includes attaching the mechanical self-tuning vibration absorber system to a variable vibrating body and monitoring a position of the connected first absorber unit and the second absorber.

The method of tracking the vibration frequency of a vibrating body 22, includes providing a mechanical self-tuning vibration absorber system 20. The provided mechanical self-tuning vibration absorber system 20 having a first absorber unit 24 with a first damping ratio and a second absorber unit 26 with a second damping ratio. The second absorber second damping ratio is different from the first absorber first damping ratio. The first absorber unit 24 is mechanically physically connected to the second absorber unit 26 wherein the connected first absorber unit and the second absorber unit mechanically walk in a first tuning direction 40 to a low tuned position 44 when excited by a variable vibrating body vibration varying frequency changing to a lower frequency and in a second tuning opposing direction 42 to a high tuned position 46 when exposed to a variable vibrating body vibration varying frequency changing to a higher frequency.

The method includes attaching the mechanical self-tuning vibration absorber system 20 to a variable vibrating body 22 and observing a position of the connected first absorber unit and the second absorber. The observing the position preferably includes observing and sensing the position with a sensing positional detector 50. Preferably the method includes monitoring a positional change of the connected first absorber unit 24 and the second absorber unit 26. Preferably the connected first absorber unit 24 and the second absorber unit 26 walk along a longitudinal track 32 which includes a plurality of measurement marks 52, which assist in the measurement of the absorber units position. The position of the absorber units on the track 32 is utilized to determine the vibration frequency of the body 22 that it is attached to. Preferably the connected first absorber unit and the second absorber unit include a friction interaction surface 34, with the friction interaction surface 34 movably contacting the track 32 with a walking interaction. The position of the connected first absorber unit and the second absorber unit on the track 32 is correlated with a vibration frequency of the body 22 so that the vibration frequency can be monitored, including tracking and measuring a change in the vibration frequency.

The invention includes a vehicle comprised of a variable vibrating body, the body having a body vibration with a varying frequency (VFBV)(Variable Frequency Body Vibration). The vehicle body includes a mechanical self-tuning vibration absorber system having a first absorber unit with a first damping ratio and a second absorber unit with a second damping ratio, the second absorber second damping ratio different from the first absorber first damping ratio. The first absorber unit is connected to the second absorber unit wherein the connected first absorber unit and the second absorber unit mechanically walk in a first tuning direction to a low tuned position when the variable vibrating body vibration varying frequency changes to a lower frequency and in a second tuning opposing direction to a high tuned position when the variable vibrating body vibration varying frequency changes to a higher frequency. The motion of the connected first absorber unit and the second absorber unit at the tuned position absorbs and cancels vehicle vibrations.

Figure 3A:
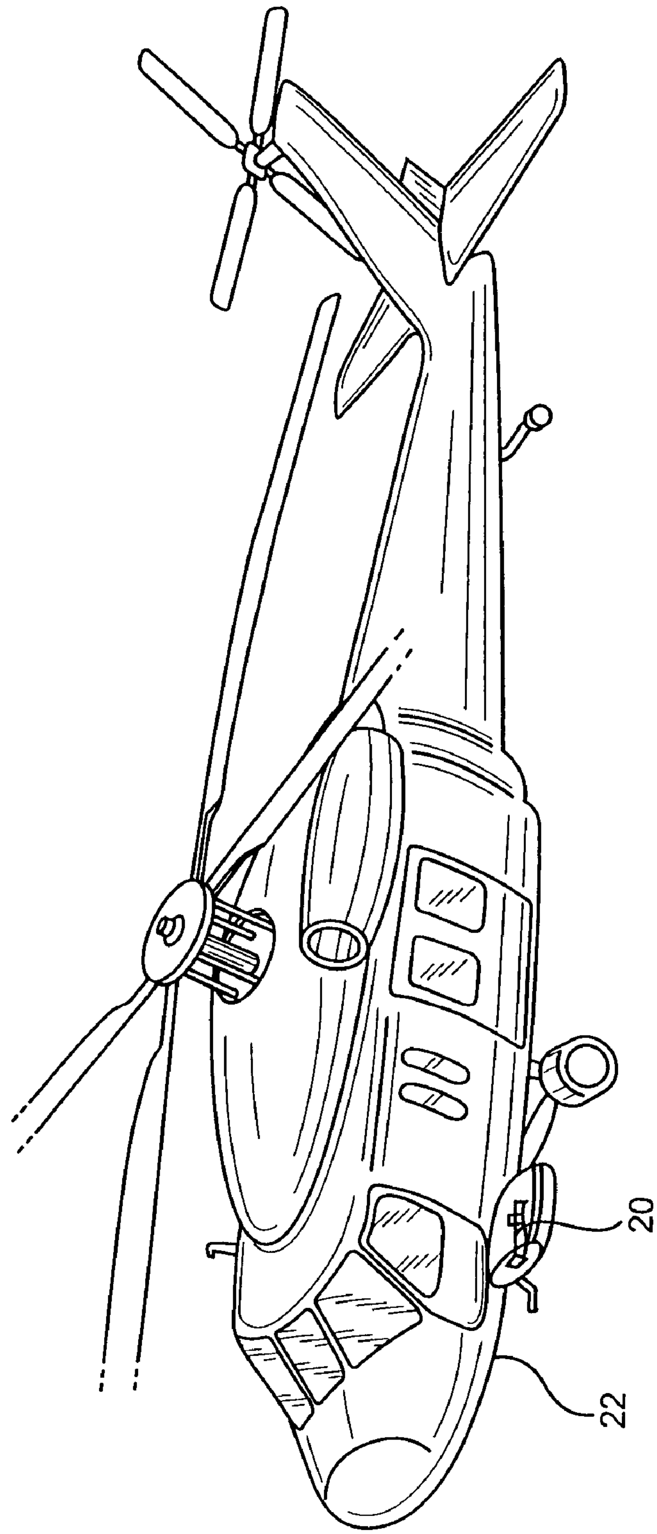
FIGS. 3A–C shows an embodiment of the invention.
Figure 3B:
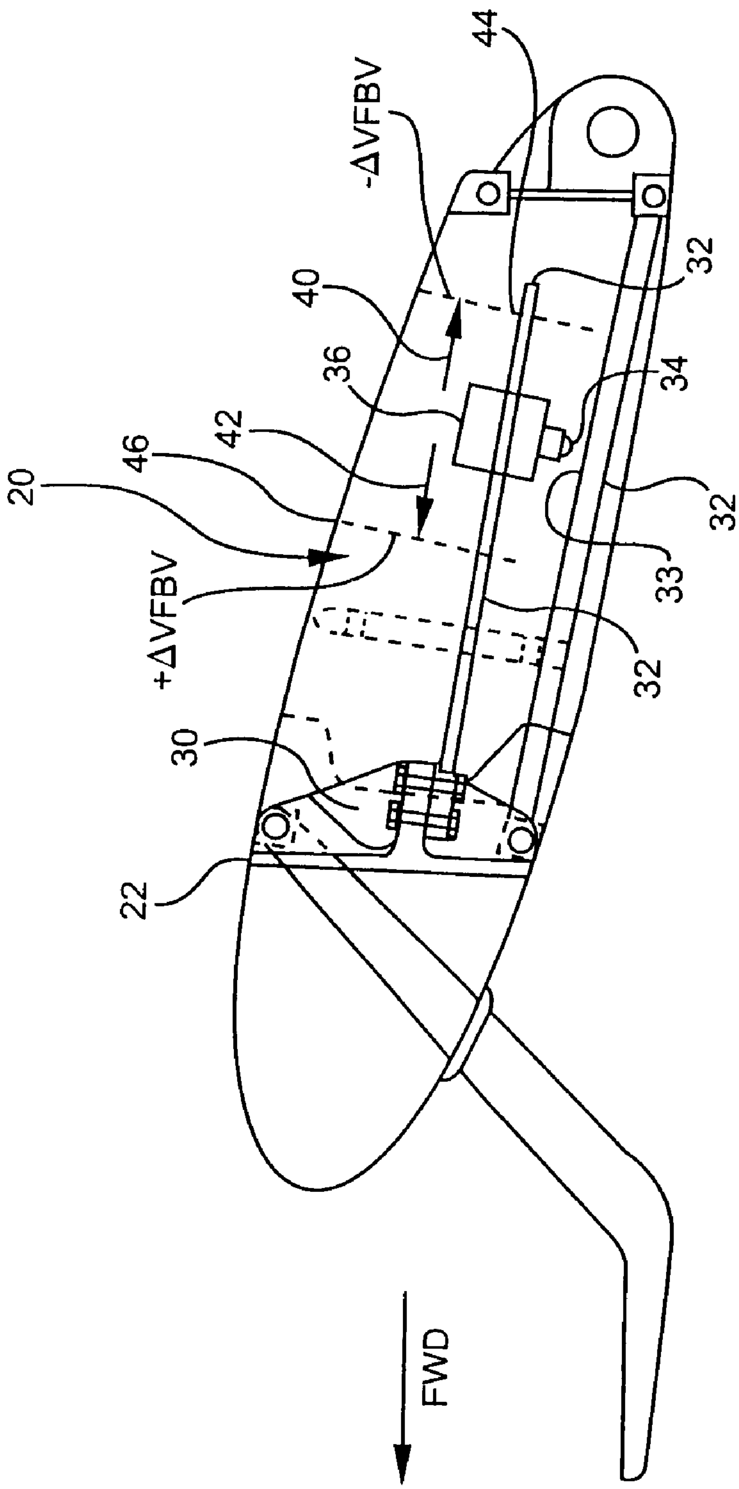
Figure 3C:
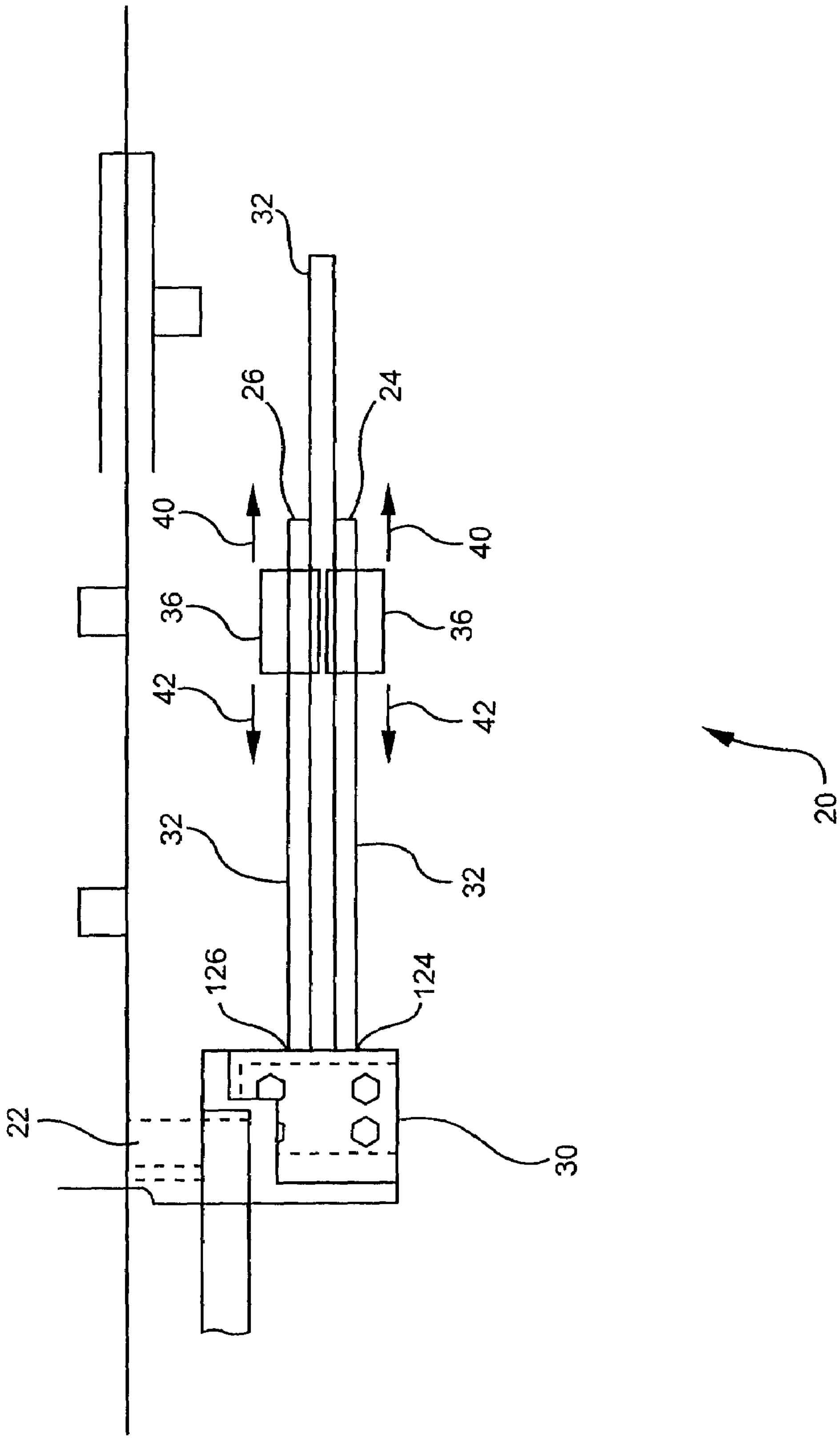

In an embodiment the vibrating vehicle body is a motor driven land vehicle. In an embodiment the vibrating vehicle body is a motor driven watercraft. In an embodiment the vibrating vehicle body is a motor driven aircraft, preferably a rotary wing helicopter aircraft. As shown in FIG. 3 the vibrating vehicle body 22 is preferably a rotary wing helicopter. Variable vibrating vehicle body 22 has a body vibration with a varying frequency VFBV(Variable Frequency Body Vibration). The body 22 includes a mechanical self-tuning vibration absorber system 20. Mechanical self-tuning vibration absorber system 20 having a first absorber unit 24 with a first damping ratio and a second absorber unit 26 with a second damping ratio, the second absorber second damping ratio different from the first absorber first damping ratio. The first absorber unit 24 is mechanically physically connected to the second absorber unit 26 wherein the connected first absorber unit and the second absorber unit mechanically walk in a first tuning direction 40 to a low tuned position 44 when the variable vibrating body vibration varying frequency changes to a lower frequency and in a second tuning opposing direction 42 to a high tuned position 46 when the variable vibrating body vibration varying frequency changes to a higher frequency. The resonant motion of the connected first absorber unit and the second absorber unit at tuned position absorbs and cancels vibrations of the helicopter body 22. Preferably the first damping ratio is greater than the second damping ratio. Preferably the mechanical self-tuning vibration absorber system 20 is attached to the body 22 with a mechanical self-tuning vibration absorber system base 30 and the connected first absorber unit and the second absorber unit mechanically walk along a vibration absorber system longitudinal track 32 with the longitudinal track 32 secured proximate to the vibration absorber system base 30 with the first tuning direction 40 away from the base and along the longitudinal track and the second tuning direction 42 toward the base along the longitudinal track. Preferably the asymmetrical damping phase difference interaction between the first absorber unit 24 and the second absorber unit 26 relative to the lower frequency drives the connected first absorber unit and the second absorber unit in the first direction 40. Preferably the asymmetrical damping phase difference interaction between the first absorber unit and the second absorber unit relative to the higher frequency drives the connected first absorber unit and the second absorber unit in the second direction 42. Preferably the first absorber unit 24 has a resonance response frequency within the range of the body vibration varying frequency and the second absorber unit 26 has a resonance response frequency within the range of the body vibration varying frequency.

The invention includes a helicopter comprised of a variable vibrating body having a body vibration with a varying frequency (VFBV)(Variable Frequency Body Vibration). The helicopter body includes a mechanical self-tuning vibration absorber system having a longitudinal track and a first absorber unit with a first damping ratio and a second absorber unit with a second damping ratio, the second absorber second damping ratio different from the first absorber first damping ratio, the first absorber unit connected to the second absorber unit wherein the connected first absorber unit and the second absorber unit mechanically walk along the longitudinal track in a first tuning direction to a low tuned position when the variable vibrating body vibration varying frequency changes to a lower frequency and in a second tuning opposing direction to a high tuned position when the variable vibrating body vibration varying frequency changes to a higher frequency. The helicopter 22 is a variable vibrating body having a body vibration with a varying frequency (VFBV). The helicopter body 22 includes a mechanical self-tuning vibration absorber system 20 having a longitudinal track 32 and a first absorber unit 24 with a first damping ratio and a second absorber unit 26 with a second damping ratio, with the second absorber second damping ratio different from the first absorber first damping ratio. The first absorber unit 24 is mechanically physically connected to the second absorber unit 26 wherein the connected first absorber unit and the second absorber unit mechanically walk along the longitudinal track 32 in a first tuning direction 40 to a low tuned position 44 when the variable vibrating body vibration varying frequency changes to a lower frequency and in a second tuning opposing direction 42 to a high tuned position 46 when the variable vibrating body vibration varying frequency changes to a higher frequency. Preferably the first damping ratio is greater than the second damping ratio and the first absorber unit has a resonance response frequency within the range of the varying frequency and the second absorber unit has a resonance response frequency within the range of the varying frequency. Preferably the asymmetrical damping phase difference between the first absorber unit and the second absorber unit relative to the varying frequency drives the connected first absorber unit and the second absorber unit.

The invention includes a method of absorbing vehicle vibrations. The method includes providing a variable vibrating vehicle body having a body vibration with a varying frequency, the varying frequency preferably in the range of 10–1,000 HZ. The method includes providing a mechanical self-tuning vibration absorber system with a mechanical self-tuning vibration absorber system base and a mechanical vibration absorber system longitudinal track, the mechanical self-tuning vibration absorber system including a first absorber unit with a first damping ratio and a second absorber unit with a second damping ratio, the second absorber second damping ratio different from the first absorber first damping ratio, the first absorber unit mechanically connected to the second absorber unit, the connected first absorber unit and the second absorber unit movably connected to the mechanical vibration absorber system longitudinal track. The method includes attaching the mechanical self-tuning vibration absorber system to the provided vehicle body wherein the connected first absorber unit and the second absorber unit mechanically walk along the longitudinal track in a first tuning direction to a low tuned position when the variable vibrating body vibration varying frequency changes to a lower frequency and in a second tuning opposing direction to a high tuned position when the variable vibrating body vibration varying frequency changes to a higher frequency. The connected first absorber unit and the second absorber unit absorb the body vibration at the walked to tuned position.

The method includes providing a variable vibrating vehicle body 22 having a body vibration with a varying frequency. Preferably the vibrating vehicle body 22 varying frequency is in the range of 10–1,000 Hz. The method includes providing a mechanical self-tuning vibration absorber system 20 with a mechanical self-tuning vibration absorber system base 30 and a mechanical vibration absorber system longitudinal track 32. The mechanical self-tuning vibration absorber system 20 includes a first absorber unit 24 with a first damping ratio and a second absorber unit 26 with a second damping ratio, the second absorber second damping ratio different from the first absorber first damping ratio. The first absorber unit 24 is mechanically connected to the second absorber unit 26, with the connected first absorber unit and the second absorber unit movably connected to the mechanical vibration absorber system longitudinal track 32. The method includes attaching the mechanical self-tuning vibration absorber system 20 to the provided vehicle body 22 wherein the connected first absorber unit 24 and the second absorber unit 26 mechanically walk along the longitudinal track 32 in a first tuning direction 40 to a low tuned position 44 when the variable vibrating body vibration varying frequency changes to a lower frequency and in a second tuning opposing direction 42 to a high tuned position 46 when the variable vibrating body vibration varying frequency changes to a higher frequency. The resonant motion of the connected first absorber unit and the second absorber unit at the tuned position absorbs and cancels the vibrations the variable vibrating vehicle body 22. Preferably the connected first absorber unit and the second absorber unit include a friction interaction surface 34 movably contacting the track's walking surface 33 with walking interaction frictional engagement steps.

Figure 4:
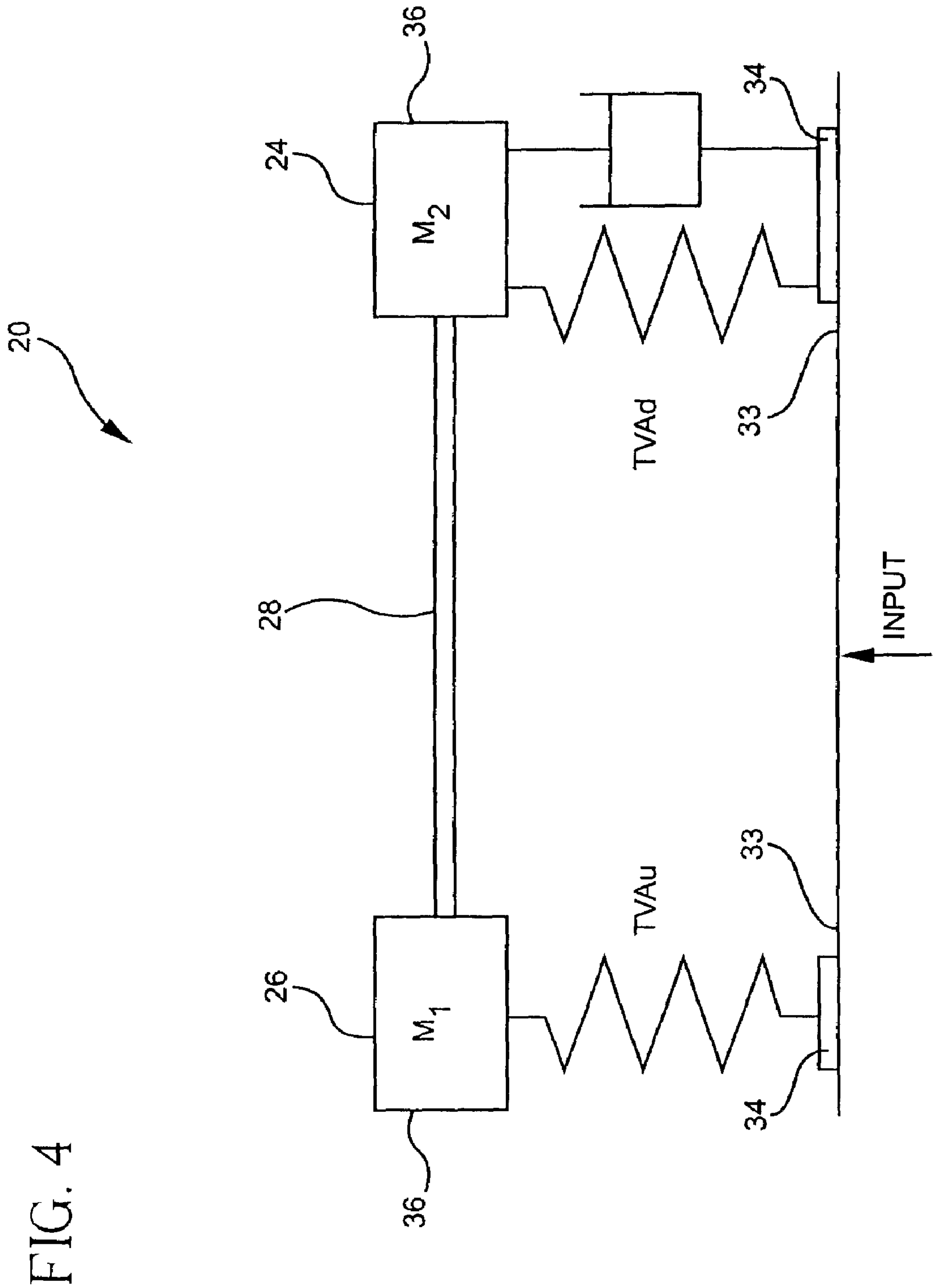
FIG. 4 shows an embodiment of the invention.
Figure 5:
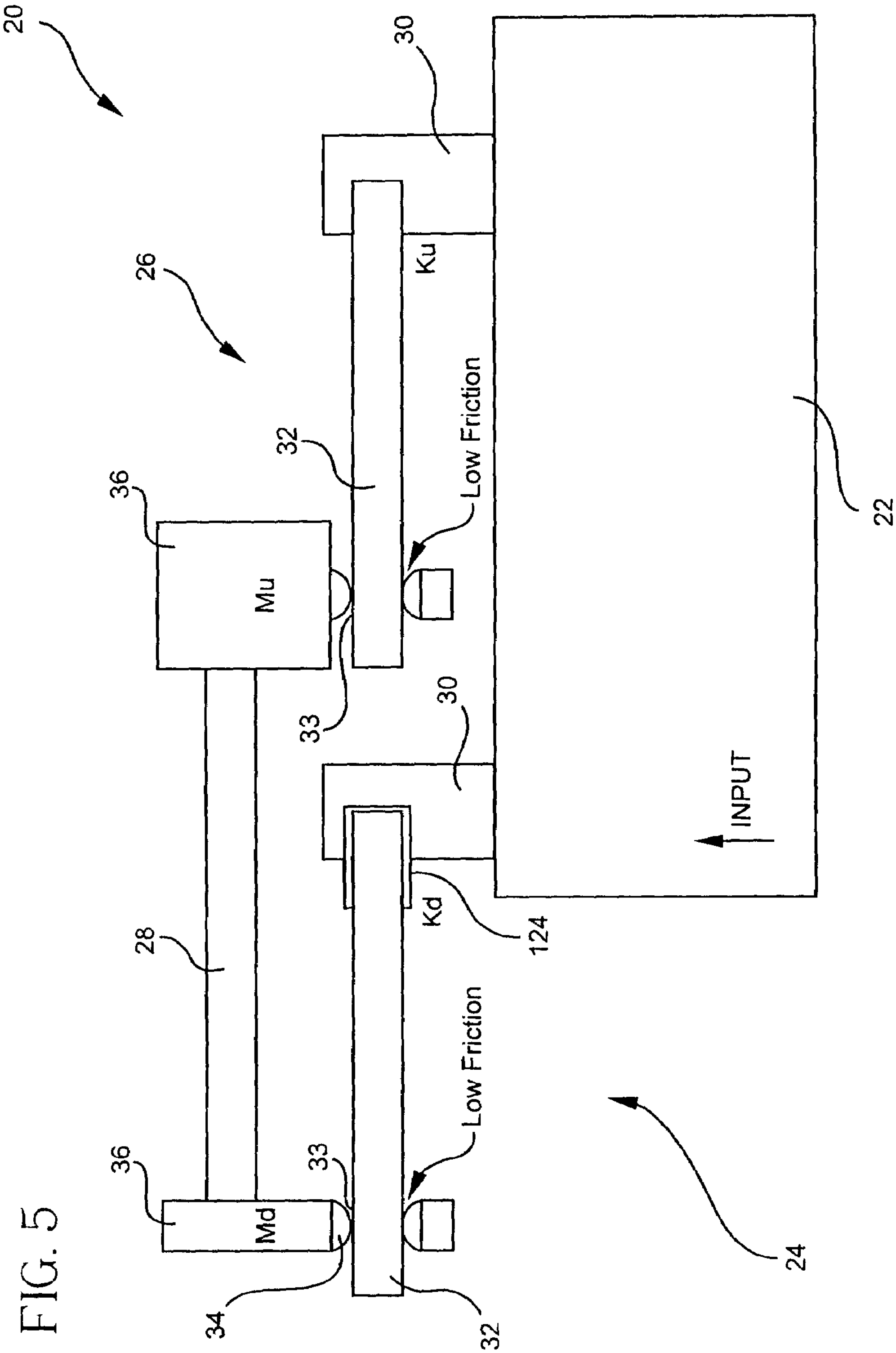
FIG. 5 shows an embodiment of the invention.
Figure 6:
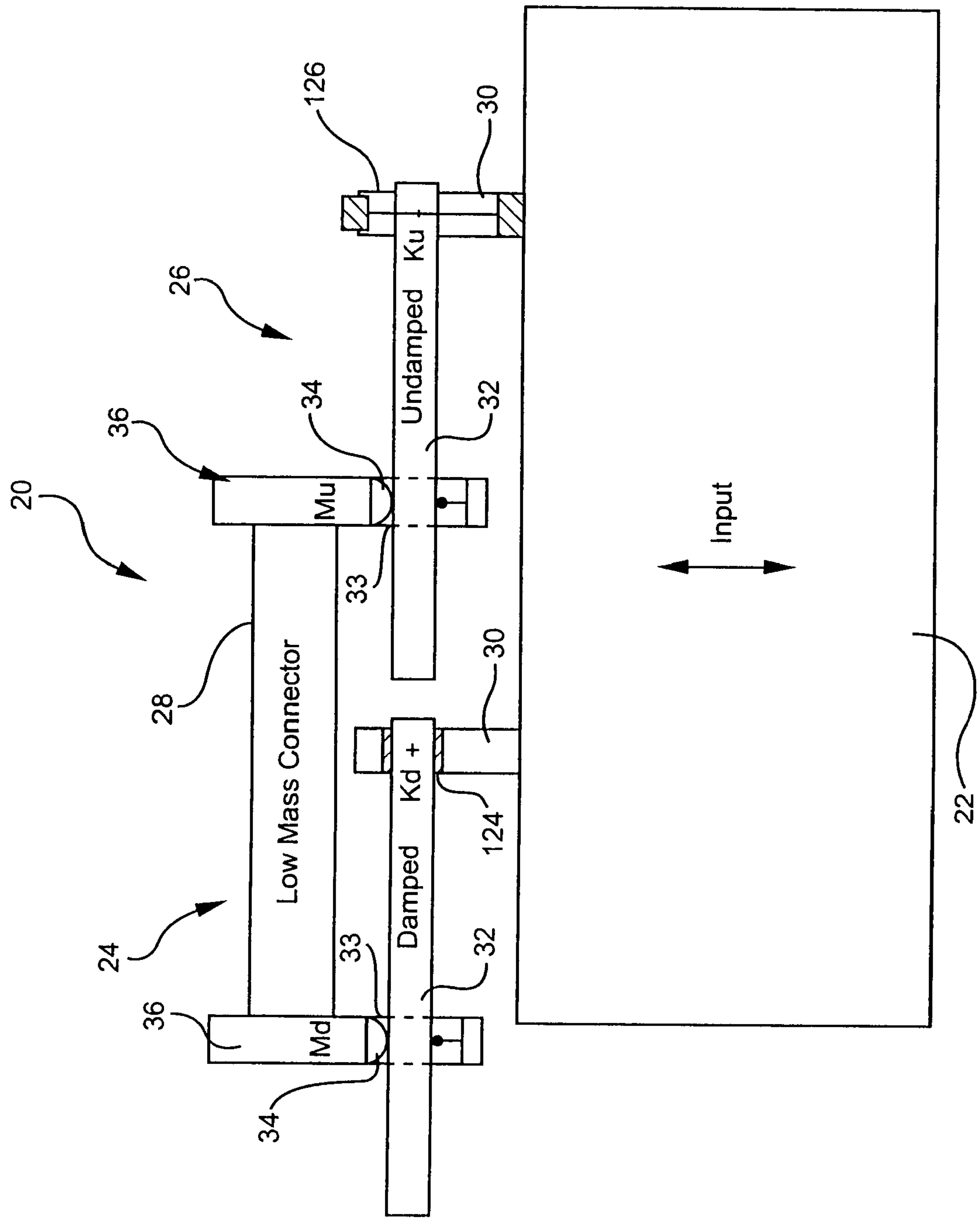
FIG. 6 shows and embodiment of the invention.
Figure 7:
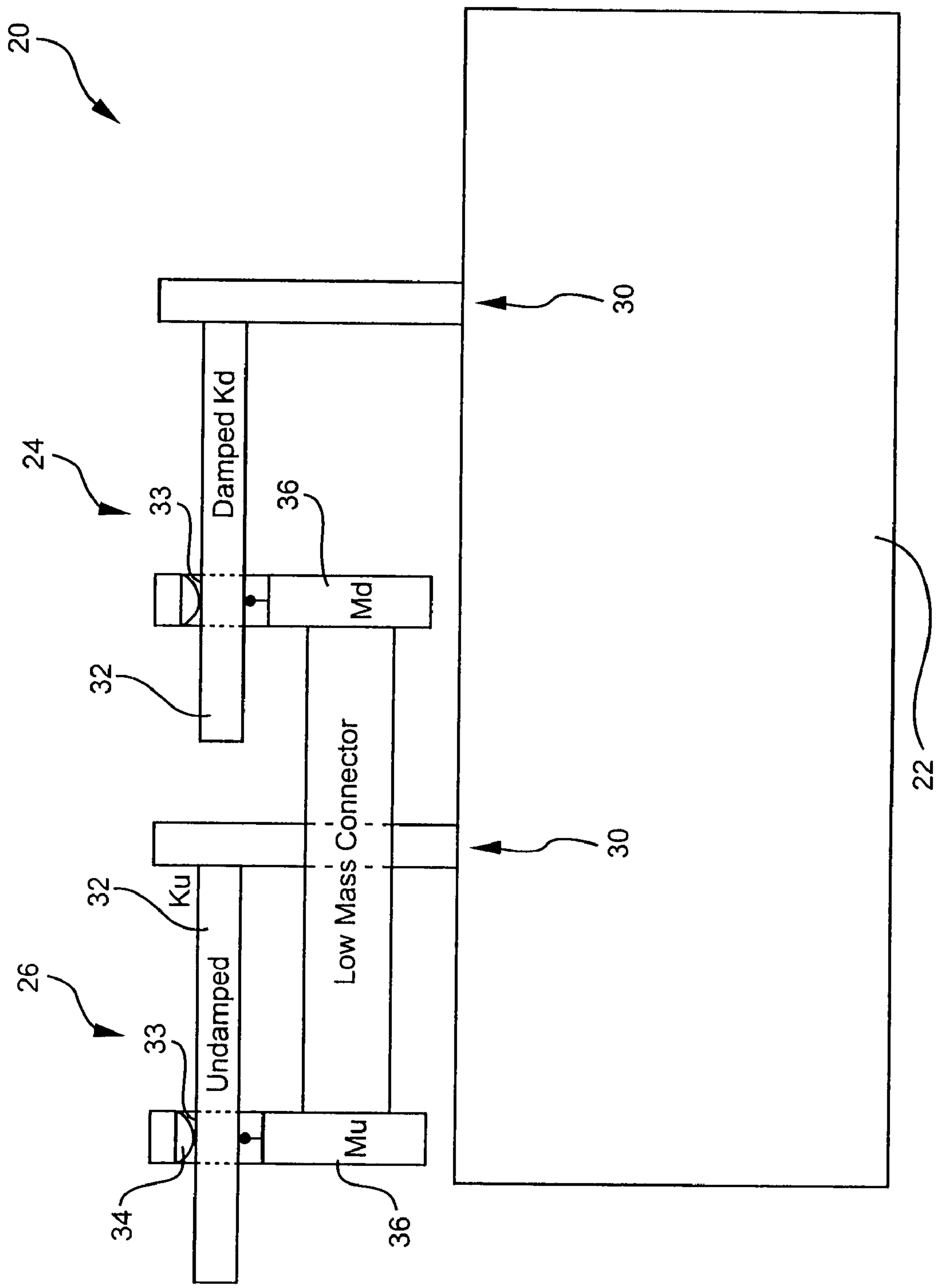
FIG. 7 shows an embodiment of the invention.
Figure 8B:
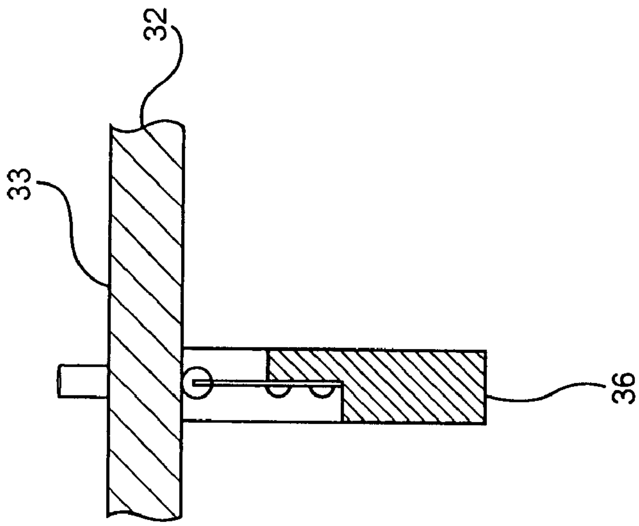
FIGS. 8A–B shows an embodiment of the invention.
Figure 8A:
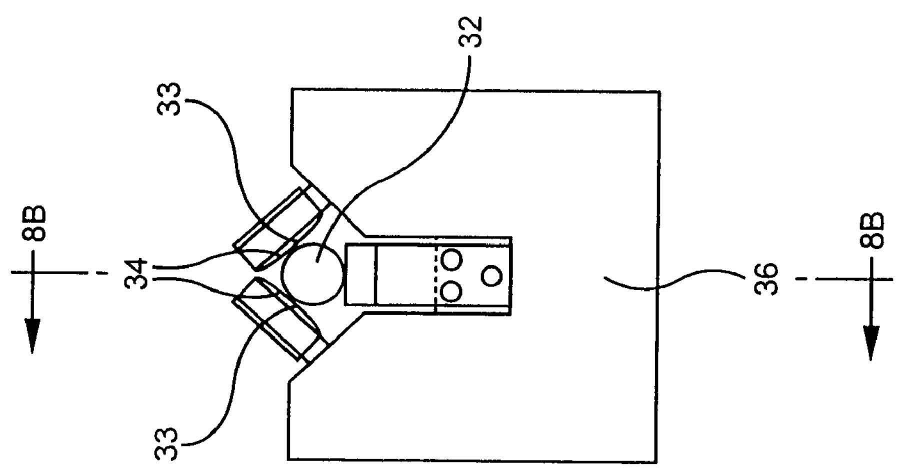
Figure 9:
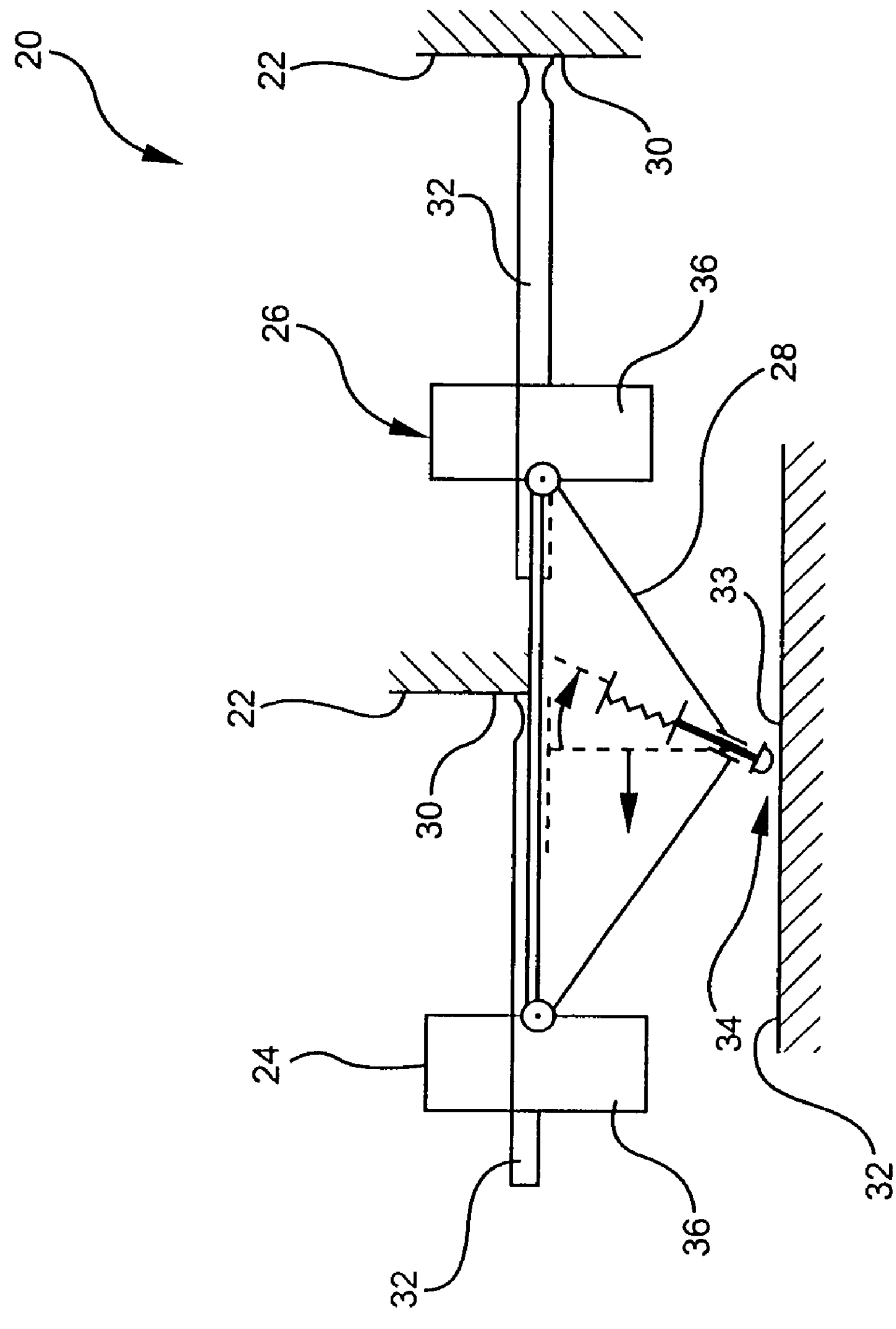
FIG. 9 shows an embodiment of the invention.
Figure 10:
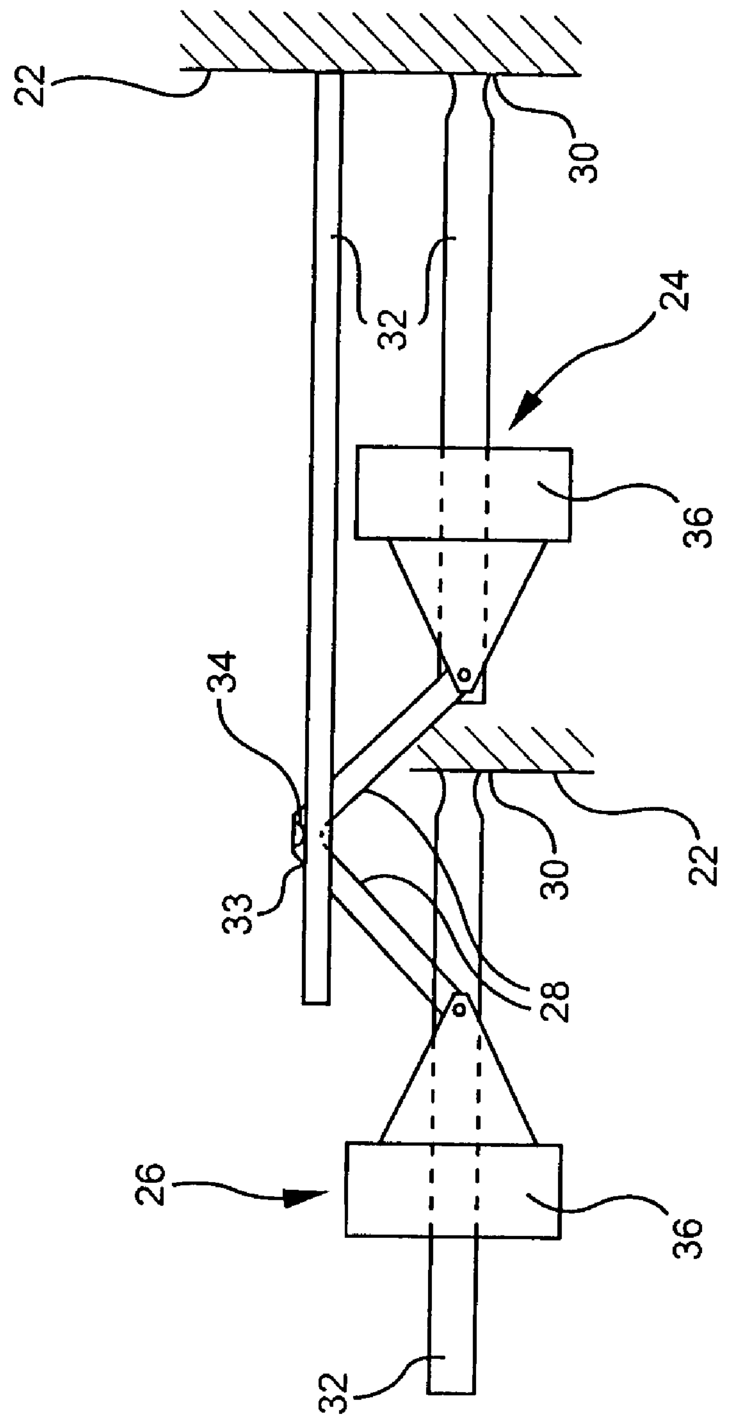
FIG. 10 shows an embodiment of the invention.
Figure 11A:
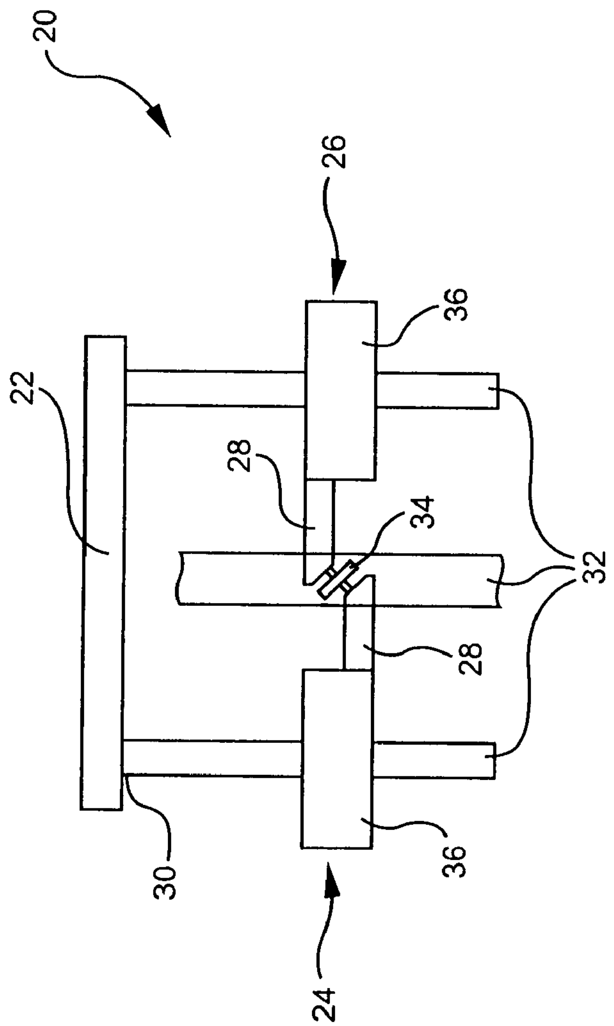
FIGS. 11A–B shows an embodiment of the invention.
Figure 11B:
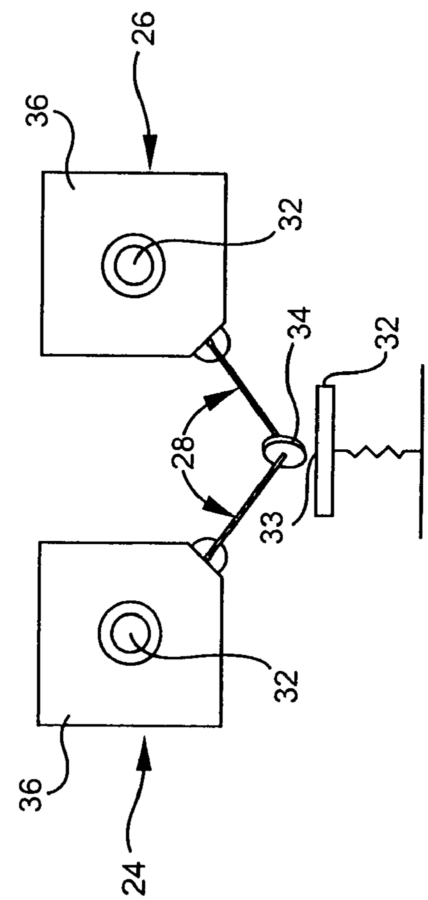
Figure 12:
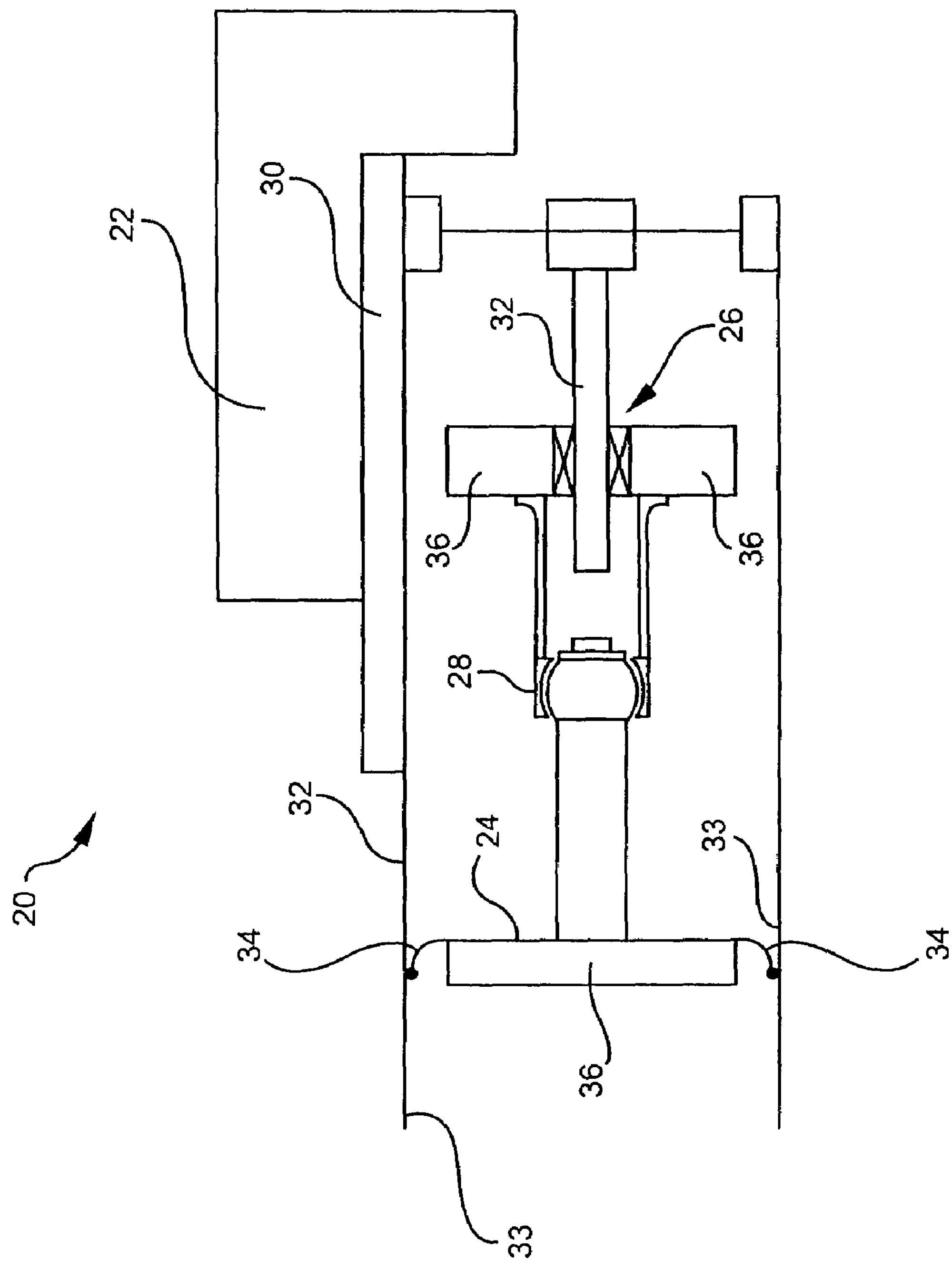
FIG. 12 shows an embodiment of the invention.
Figure 13:
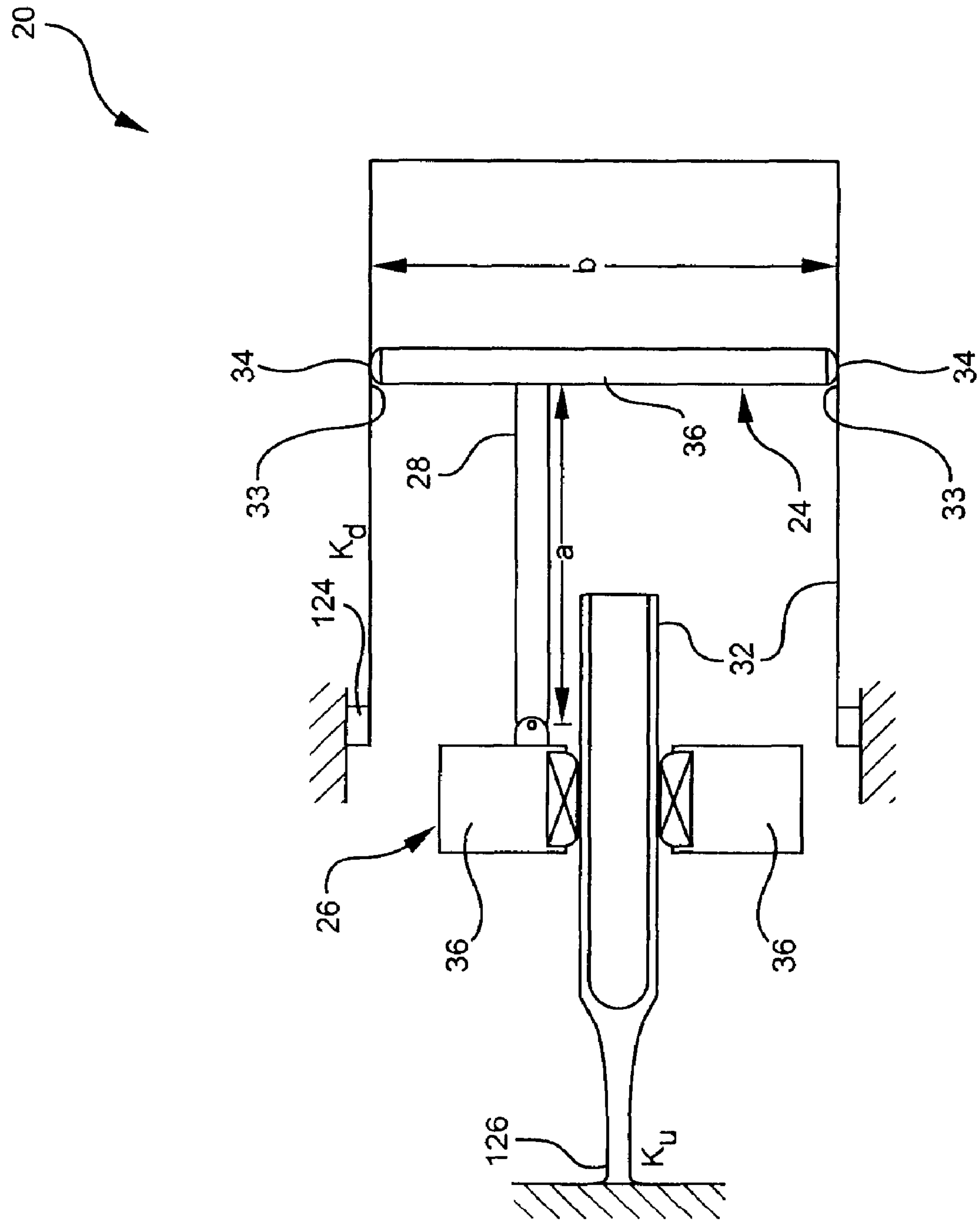
FIG. 13 shows an embodiment of the invention.
Figure 14:
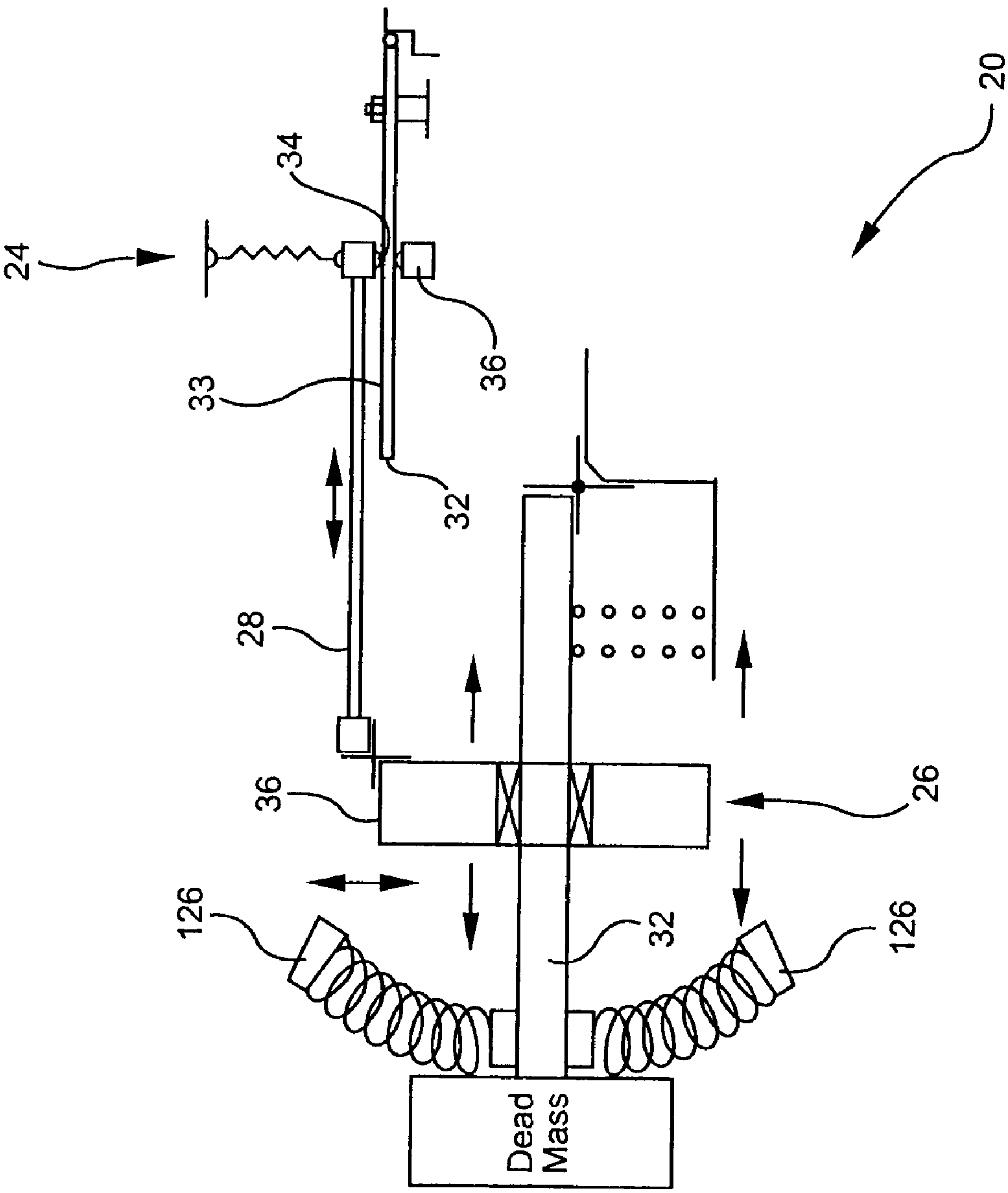
FIG. 14 shows an embodiment of the invention.
Figure 15A:
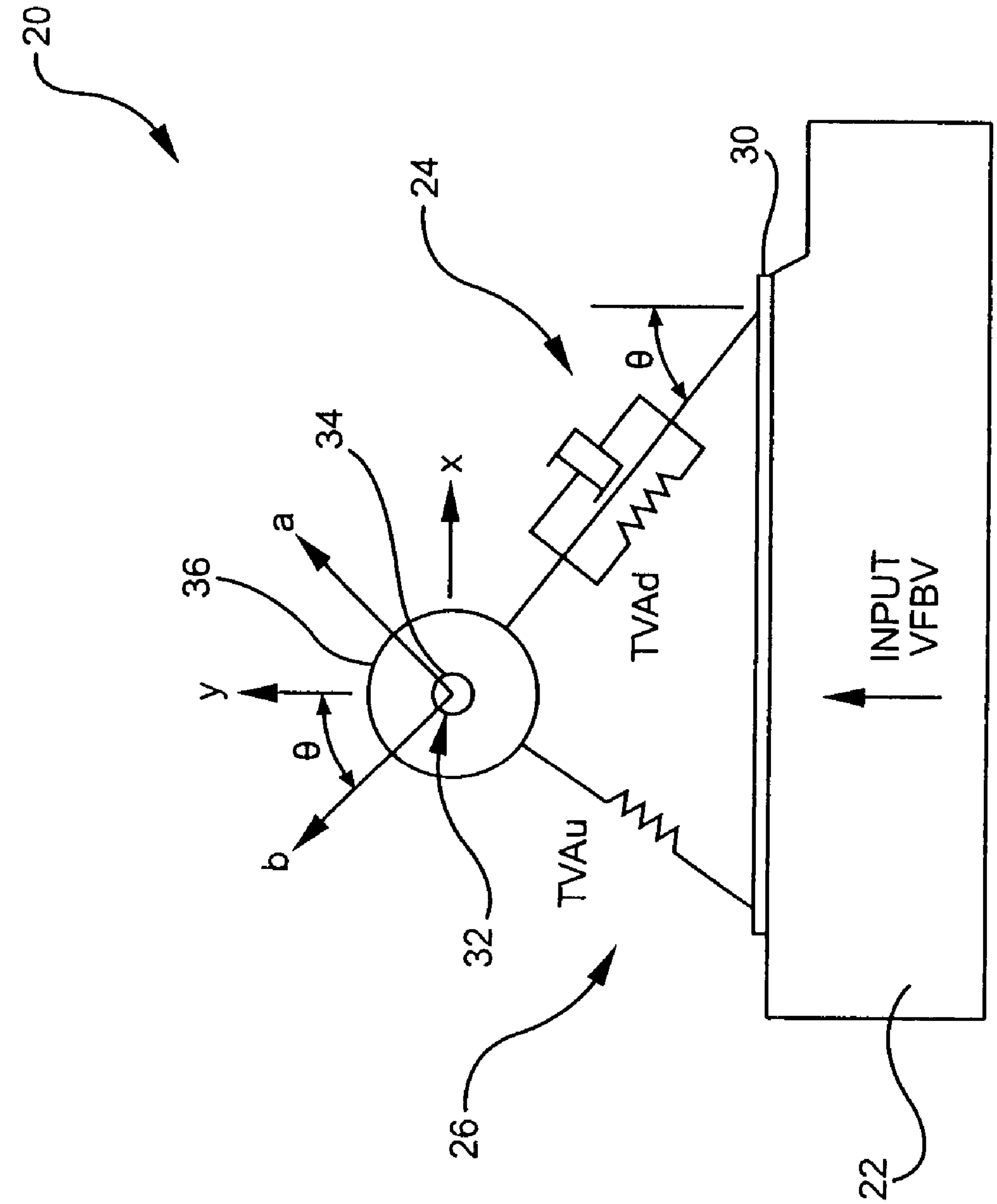
FIGS. 15A–B shows an embodiment of the invention.
Figure 15B:
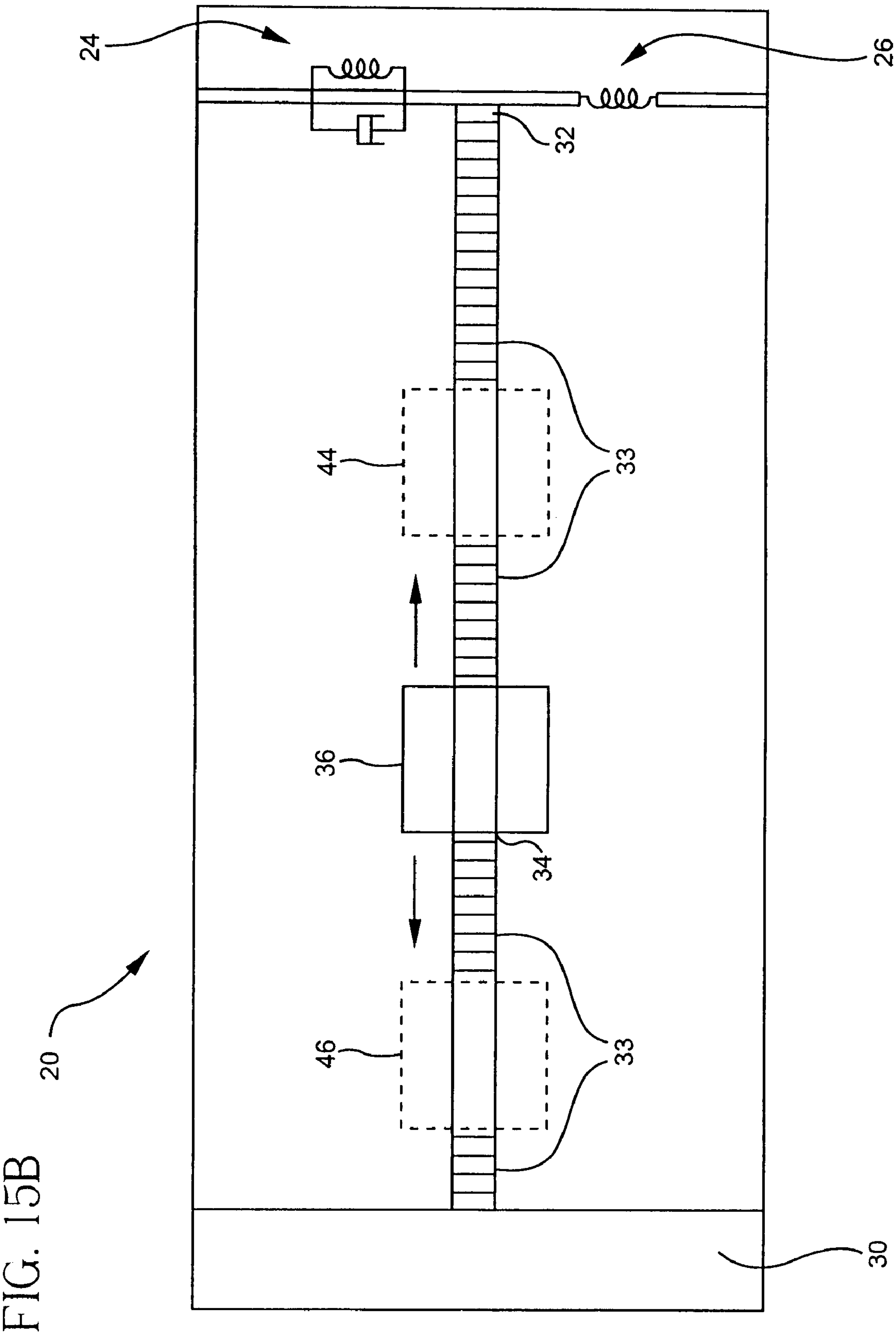

FIG. 4 illustrates a model embodiment of the invention. The lower ends friction interaction surface 34 of the springs and damper can lift off the surface 33 (gravity acts downward). With vertical base input, both TVAs are excited, but they have different responses as shown in FIG. 2. If the input frequency is below the resonance of TVAu, then TVAd lags TVAu and the device walks off to the right. If the input frequency is above resonance, the device walks off to the left. The invention utilizes such walking mechanism by coupling the natural frequency with the movement left or right. In preferred embodiments coupling to the natural frequency is through a cantilever beam because left/right movement directly changes the natural frequency. FIGS. 5–8 illustrate further embodiments utilizing cantilever beams. Mu is the mass of the undamped TVA, Ku is the spring of the undamped TVA, Md is the mass of the damped TVA, and Kd is the spring of the damped TVA. In order to create a TVA with the highest possible amplification (Q), the mass Mu should be significantly larger than Md (with Ku commensurately larger than Kd). In such embodiments friction interaction surface 34 is a high friction element, such as a high friction bearing, on one side of the catilever beam track 32 with an opposing relatively low friction element, such as a low friction bearing, on the other side of the beam. FIGS. 8A–B show embodiments of high friction elements and low friction elements. A high friction element embodiment as shown in FIG. 8 includes a dowel pin with a bonded rubber sleeve that provides friction interface surface 34 for walking step contact with the track walking surface 33 of longitudinal track 32. A low friction element embodiment as shown in FIG. 8 includes a track contact bearing with a flexing flexure which effectively lowers friction because of compliance in the direction of the beam track axis. FIGS. 9–14 show additional walking cantilever beam embodiments. The FIG. 9 embodiment includes a differential walking friction interaction surface 34 in which the interaction surface is angularly adjustably attached to connector 28 to allow an adjustment position to maximize tuning walking motivation and an angle that minimizes damping at resonance. The FIG. 10 embodiment includes connector 28 extensions with the masses 36, with the lightweight connector extension with damped mass 36 amplifying the damped motion and the lightweight connector extension with undamped mass 36 attenuating the undamped motion. The FIG. 11 embodiment includes a connector 28 angled wheel walking friction interaction surface 34 which turningly walks along track walking surface 33 of vertically movable longitudinal track 32, with linear bearings between masses 36 and tracks 32 allowing travel along the tracks 32. The FIG. 12 embodiment includes the absorber unit 24 small mass 36 Md with friction interaction surface 34 damped springed thereto, a spherical joint connector 28 with the absorber unit 26 mass 36 Mu with a linear bearing on longitudinal track 32 which is undamped sprung mounted with a trunnion plate to base 30. The FIG. 13 embodiment includes the absorber unit 26 mass 36 being of a relatively high density with low friction preloaded bearings with no clearance on undamped longitudinal track 32, with absorber unit 26 mass 36 coupling connected with a connector 28 with a length a to absorber unit 24 mass 36 being of a relatively low density and having a length b, with the absorber unit 24 mass 36 walking ends having the friction interaction surfaces 34 having a high friction and slight clearance with the track walking surface 33 of walking track 32 which is dampered by elasotmer bonded rubber spring element 124, preferably with the ratio length a:b [length connector 28(*a*):length of mass 36 of unit 24(*b*)] with a≦b (length of connector less than length of mass 36). The FIG. 14 embodiment includes an optional fixed dead mass with undamped mass 36 of absorber unit 26 sliding on a linear bearing along longitudinal track 32 that is undamped sprung with undamped spring 126, with mass 36 pivotally connected with connector 28 to damped mass 36 of absorber unit 24. Some of these are axi-symmetric, meaning that they work for input in any direction perpendicular to the axis of the device, including planar orbiting input motion. Input in the axial direction is not detrimental to the device, but it does not result in tuning. An alternative to Kd implemented as a damped flexure or an elastomeric spring is to design friction into the TVAd beam-mass interface. Another alternative is to use particle damping within the mass Md. A further embodiment of the invention is shown in FIG. 15 which utilizes the undamped and damped frequency response relationship of FIG. 2. In this embodiment, the mass 36 of TVAd 24 and the mass 36 of TVAu 26 are one and the same as shown in FIG. 15. For clarity, no damper is drawn for TVAu, even though such a TVA will have some small damping. With base 30 input in the direction shown in FIG. 15, both TVAs are excited. If the input frequency (VFBV) is below the resonance of TVAu, then TVAd (motion of mass 36 in direction b) lags TVAu (motion of mass 36 in direction a) and the mass orbits or whirls counterclockwise. If the input frequency (VFBV) is above the resonance of TVAu 26, then TVAd 24 leads TVAu and the mass orbits or whirls clockwise. Longitudinal beam track 32 is a threaded rod cantilever beam track such that the clockwise and counterclockwise whirling orbit of mass 36 walks the mass along the length of the threaded rod.

Figure 16B:
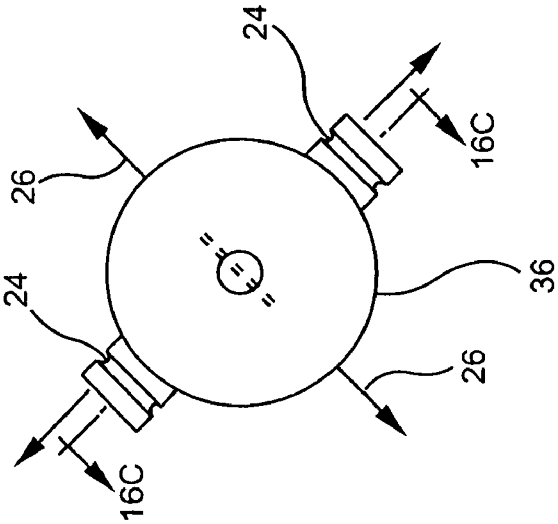
FIGS. 16A–C shows an embodiment of the invention.
Figure 16C:
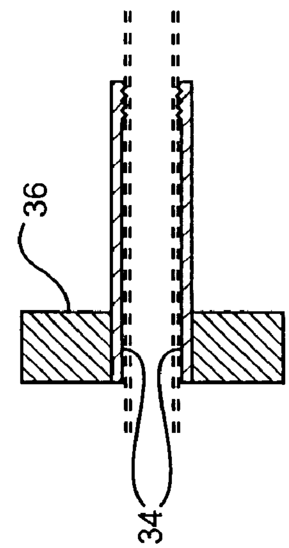
Figure 16A:
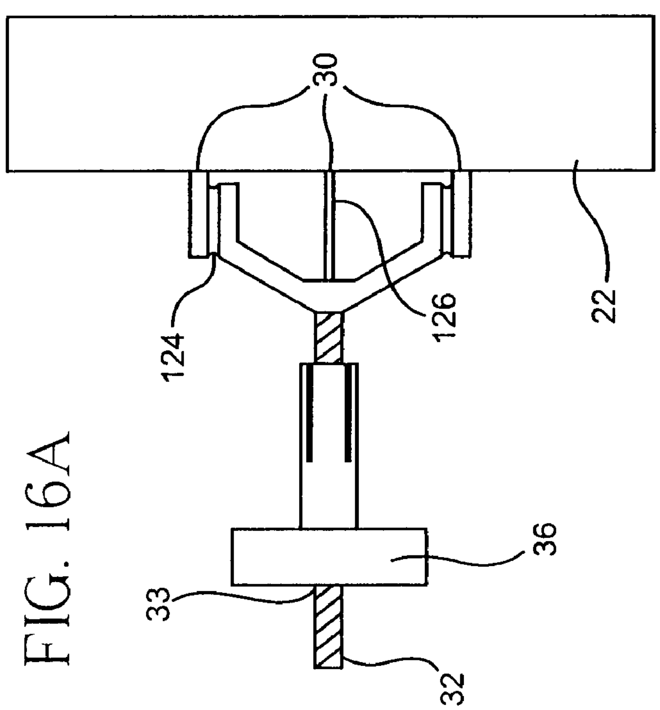

In embodiments, it is preferred to incorporate elastomeric or polymeric elements into the base of the beam so that the elements provide stiffness predominately in only one direction. This approach will work best if the beam is designed to be rigid and the compliance is localized at the base of the beam. An example is provided in FIG. 16. The FIG. 16 embodiment utilizes the whirling walking motion on a threaded rod with the absorber having two degrees of freedom with elastomeric spring element 24 with high damping having its highest degree of stiffness in a direction different from that of flexure spring direction 26.

Figure 17B:
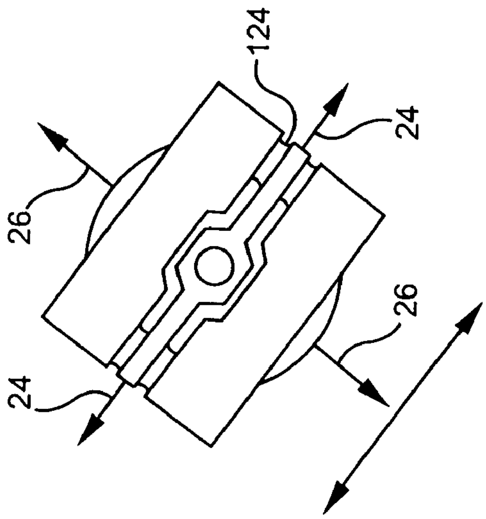
FIGS. 17A–B shows an embodiment of the invention.
Figure 17A:
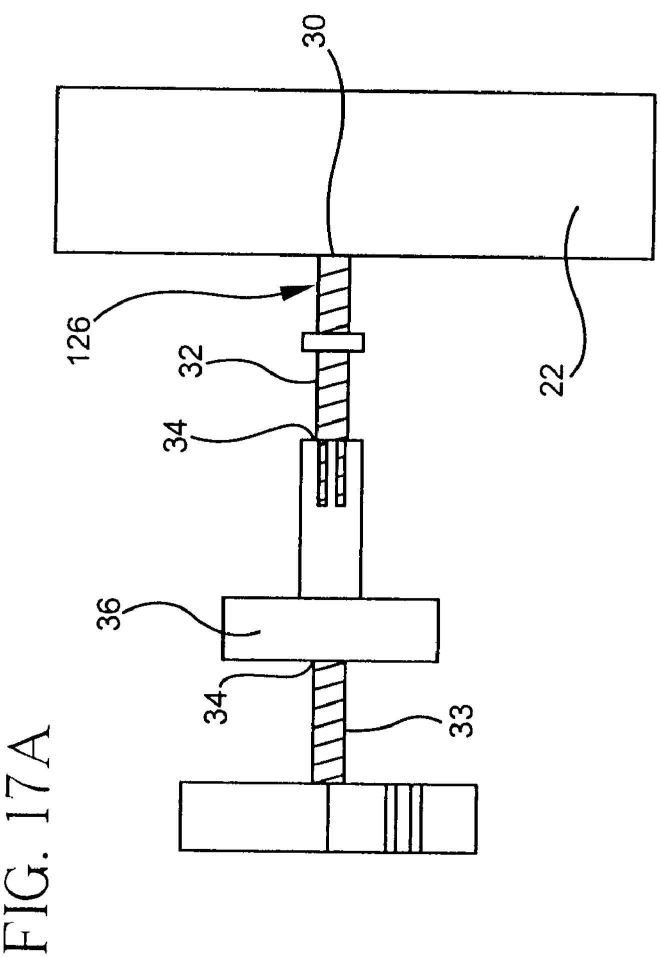

Another way of creating asymmetrical damping is to place a directional tuned mass damper (TMD) on the end of the beam. The TMD (having a fixed tuned frequency) should be tuned lower than the STVA frequency range and have approximately 0.4 damping ratio. This device can be as simple as a mass mounted on elastomeric shear pads. This embodiment is shown in FIG. 17, where the directions of 26 and 24 are perpendicular, with the two directions being the two absorber units. The highly damped elastomeric elements 124 provide damping in the shear direction 24.

Figure 18:
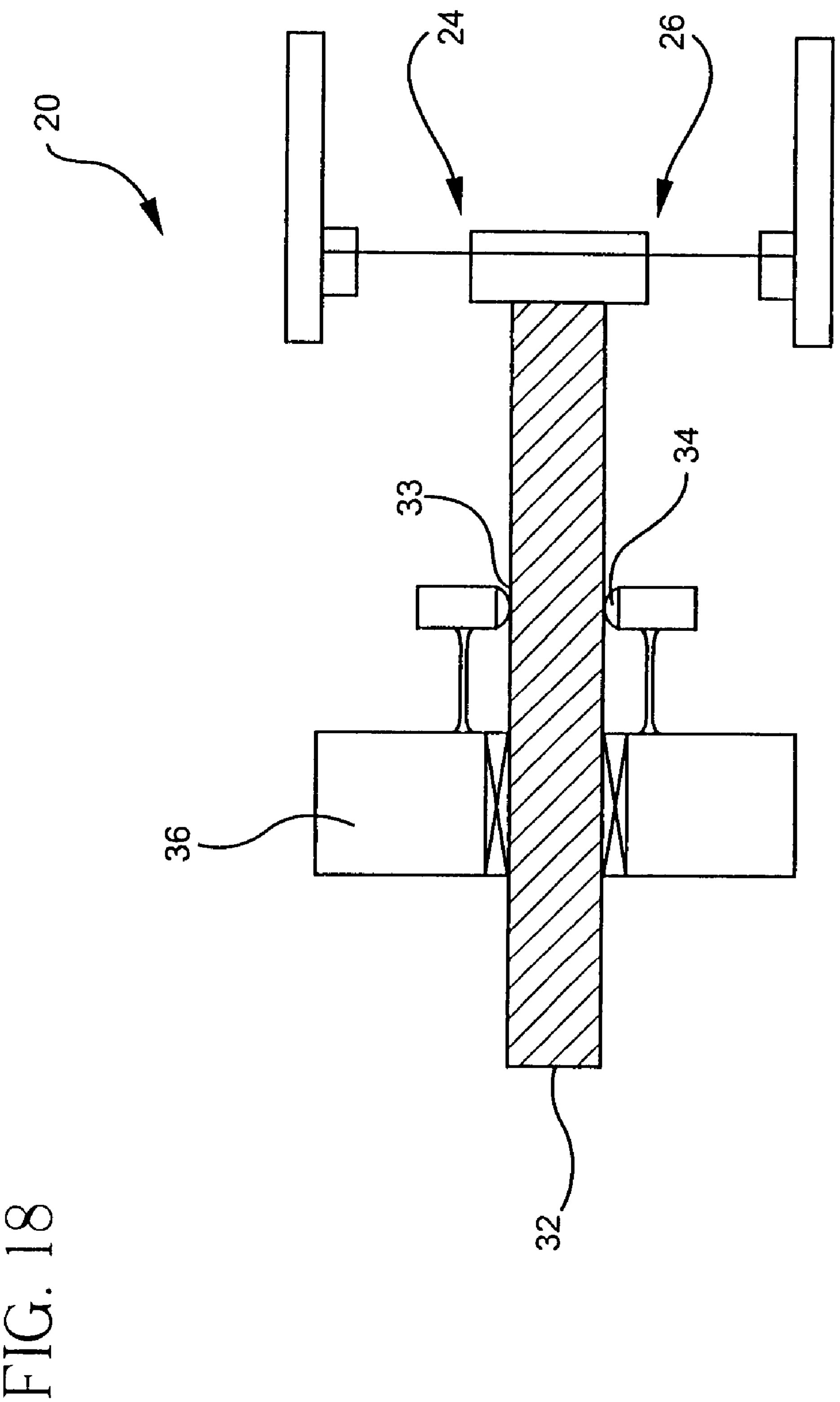
FIG. 18 shows an embodiment of the invention.

It is beneficial to minimize the rattling of the mass on the beam, yet have sufficient clearance for self-tuning to occur. The best way of minimizing rattling is to place most of the mass on preloaded ball nuts and link that subsystem to a small driver mass that has clearance with the beam. This is illustrated in FIG. 18. Preferably, a tubular elastomeric member is placed between the driver mass and the beam to attenuate noise.

Preferably the asymmetrical damping causes the desired orbiting motion and the collapsed orbit at resonance which the mass seeks out corresponds to minimizing the motion of the structure to which the STVA (Self-Tuning Vibration Absorber) is attached.

Figure 19B:
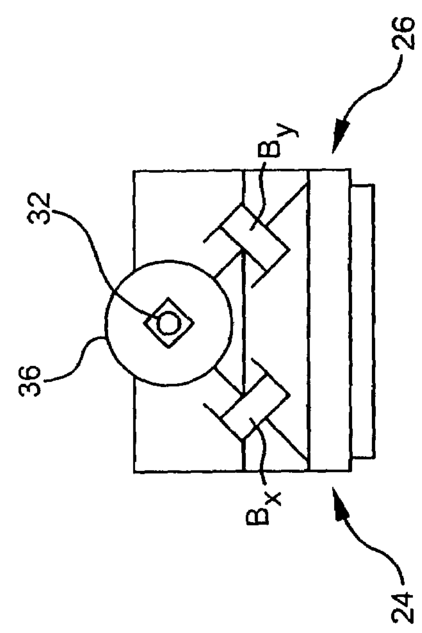
FIGS. 19A–B shows an embodiment of the invention.
Figure 19A:
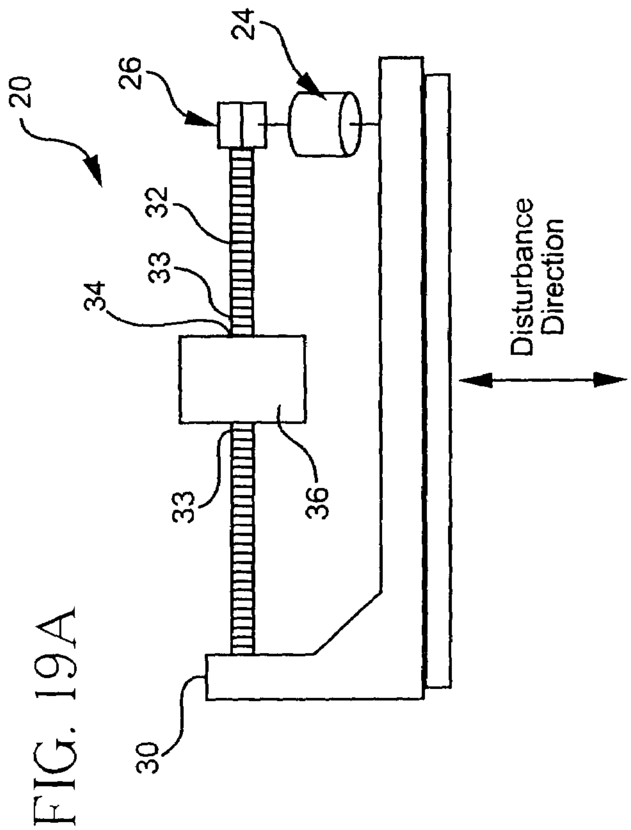

The invention includes an all-mechanical self-tuning vibration absorber as disclosed in FIG. 19 which is based on asymmetrical damping of a threaded beam supporting a threaded mass that is free to rotate. The asymmetrical damping in conjunction with an input displacement of the base generates an orbit response (whirl) in the beam. That is, the tip of the beam traces an ellipse. The orbital motion causes the threaded mass to wobble and rotate about the beam, which in turn causes the mass to walk along the beam threaded track. The direction of travel is a function of the disturbance frequency relative to the resonant frequency of the beam-mass system such that the device inherently tunes its resonance to the disturbance. When the resonant frequency matches the disturbance frequency, the orbital motion collapses into linear motion, and the mass no longer wobbles and, consequently, doesn't travel along the beam. The cantilevered threaded bar track possesses stiffness in two directions and a very small amount of internal damping. The threaded mass has enough clearance with the bar to allow a small amount of relative motion in the radial direction—for low displacement applications, similar to a standard nut on a bolt. The two dampers (which can be reduced to one) are arranged at 45° to the disturbance direction. For a right-handed thread, $B_x<B_y$; for a left-hand thread, $B_x>B_y$. This asymmetrical damping causes the bar to move in an elliptical or orbital motion in response to a uni-directional input. As a consequence of the orbital motion, the threaded mass travels along the bar until the system resonance matches the disturbance frequency. The amount of damping required to induce orbital motion in the threaded rod is fairly small, so the effectiveness of vibration absorption of the device remains high. For $B_x<B_y$ with input frequency below resonance, the bar orbits counterclockwise, and above resonance the orbit is clockwise. There is clearance for wobble motion in response to the bar's orbit which, because of the threaded coupling between the mass and the bar, causes the mass to travel in the direction that will drive the system resonance toward the disturbance frequency.

Figure 20:
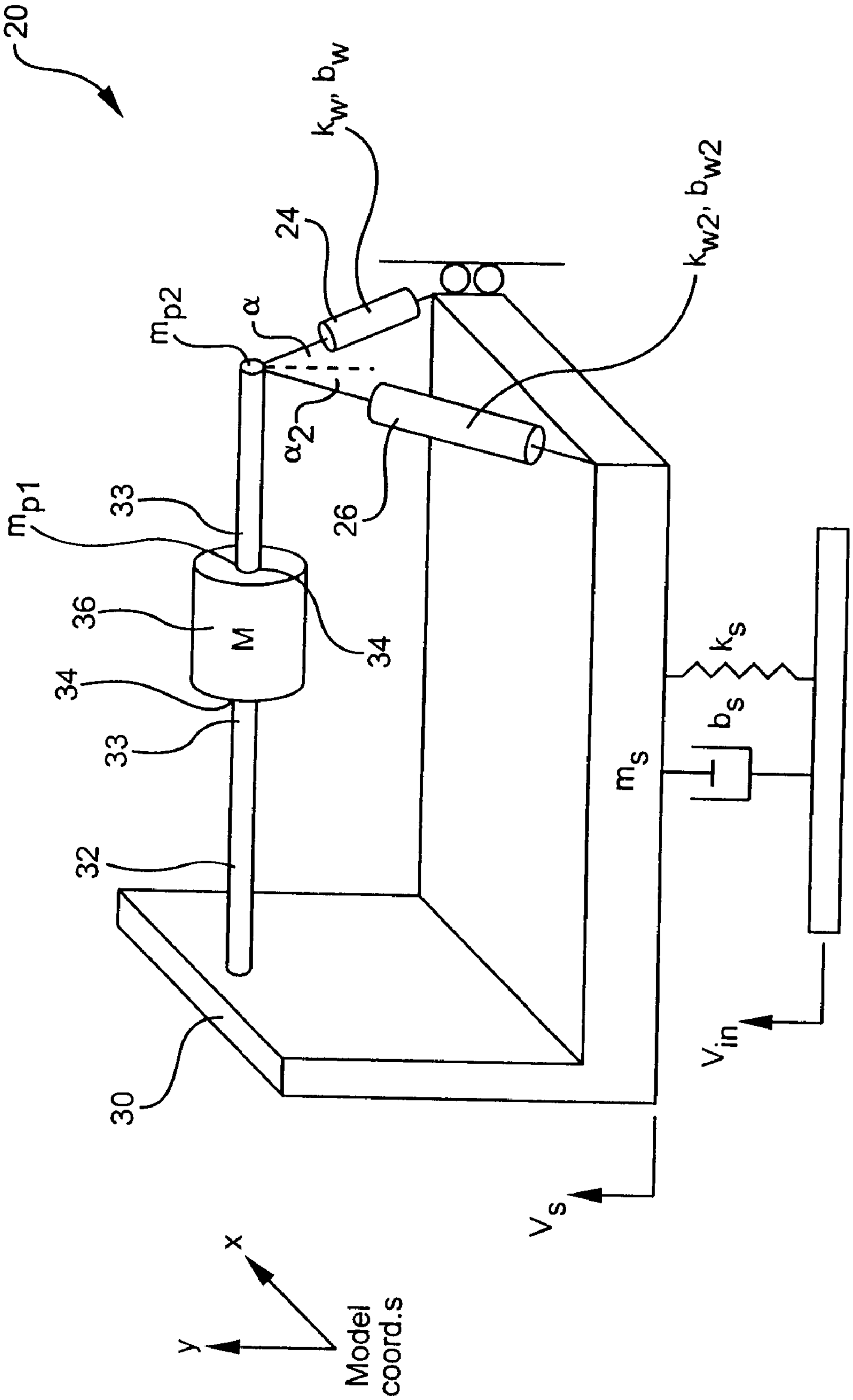
FIG. 20 shows an embodiment of the invention.
Figure 21:
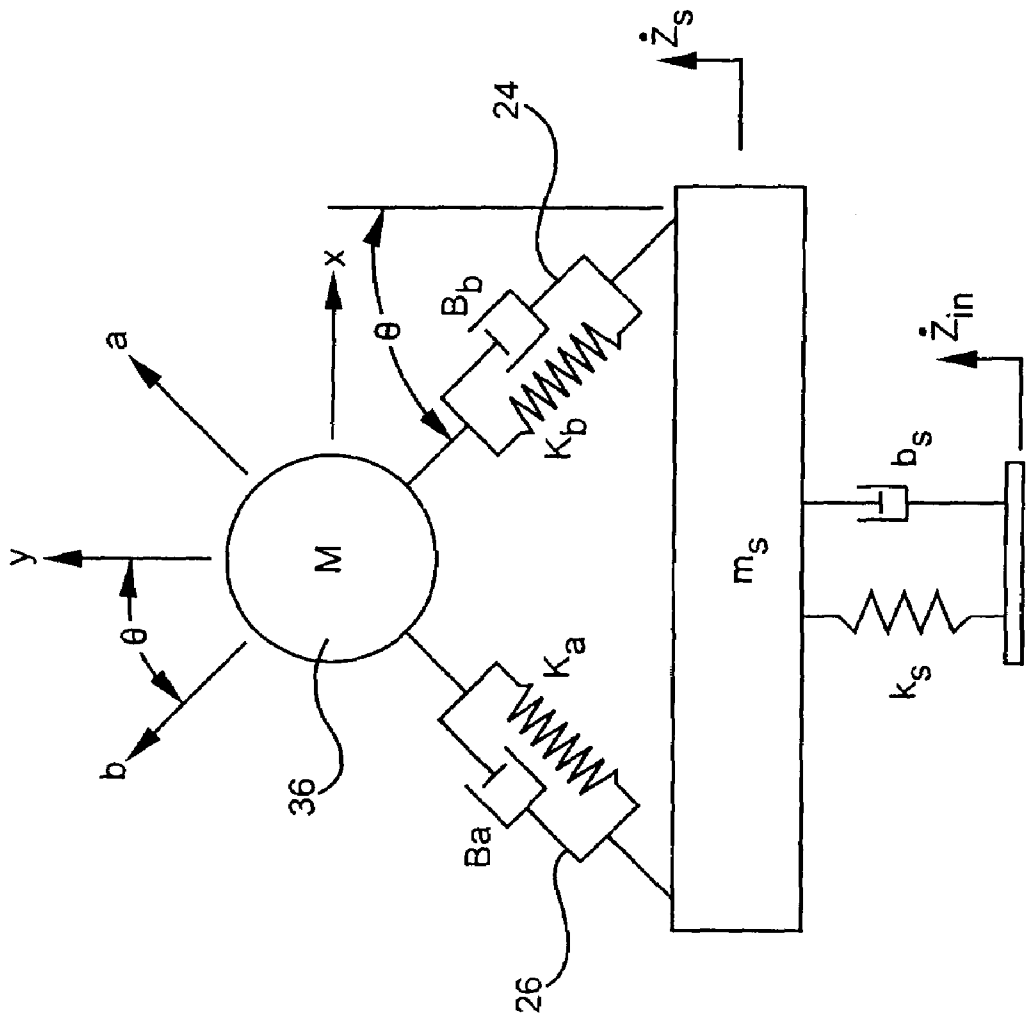
FIG. 21 shows an embodiment of the invention.

The uni-direction STVA and a linear beam whirl beam model is described. The beam whirl model explains how and why the unidirectional STVA works. The unidirectional STVA is shown schematically in FIG. 20. This device acts to cancel vibration input from the vertical, y, direction. The device has a longitudinal track threaded beam perpendicular to the input direction which is asymmetrically damped. On the longitudinal beam is a loosely threaded solid mass which is free to move along the beam as it rotates. The first step in understanding how this STVA works is to construct a linear model of a sprung mass, asymmetrically damped, with a unidirectional vibration input such as shown in FIG. 21. This model yields insight into why the beam would whirl in one direction when the input frequency is below the natural frequency of the sprung mass and in the other direction when the input frequency is above the natural frequency. The springs in the whirl model (FIG. 21) not only represent the springs at the end of the beam in FIG. 20, but the stiffness of the beam as well. The solid mass M and the first spring a and damper a form the first absorber unit with a first sprung solid mass first damping ratio. The mass M and the second spring b and damper b form the second absorber unit with the different second damping ratio. Assuming the strut angle, θ, in FIG. 21 is 45 degrees and the struts are 90 degrees apart. Thus, a 45 degree triangle is formed by the struts and the structural mass, $m_s$. The purpose of this model is to understand why the mass, M, whirls in the direction that it does. The mass, M here represents the combined mass of the beam and tuning mass, M.

The direction of whirl is dependent on two factors. The first factor is whether the input, $Z_{in}$, is above or below the natural frequency of the mass, M. The second factor is whether the left damping constant, $B_a$, is greater or less than the right damping constant, $B_b$. The below Whirl Direction of Mass Table outlines how the mass, M whirls depending on the two factors.

TABLE

The Whirl Direction of Mass, M

| The Motion of Mass, M | Damper Inequality | The input frequency of $Z_{in}$ is ___the natural frequency of the mass, M. |
|---|---|---|
| Whirls counter-clockwise | $B_a < B_b$ | Below |
| Whirls clockwise | $B_a < B_b$ | Above |
| Whirls clockwise | $B_a > B_b$ | Below |
| Whirls counter-clockwise | $B_a > B_b$ | Above |
| A straight vertical up and down motion | $B_a = B_b$ | Above or Below or Equal to |

Figure 22:
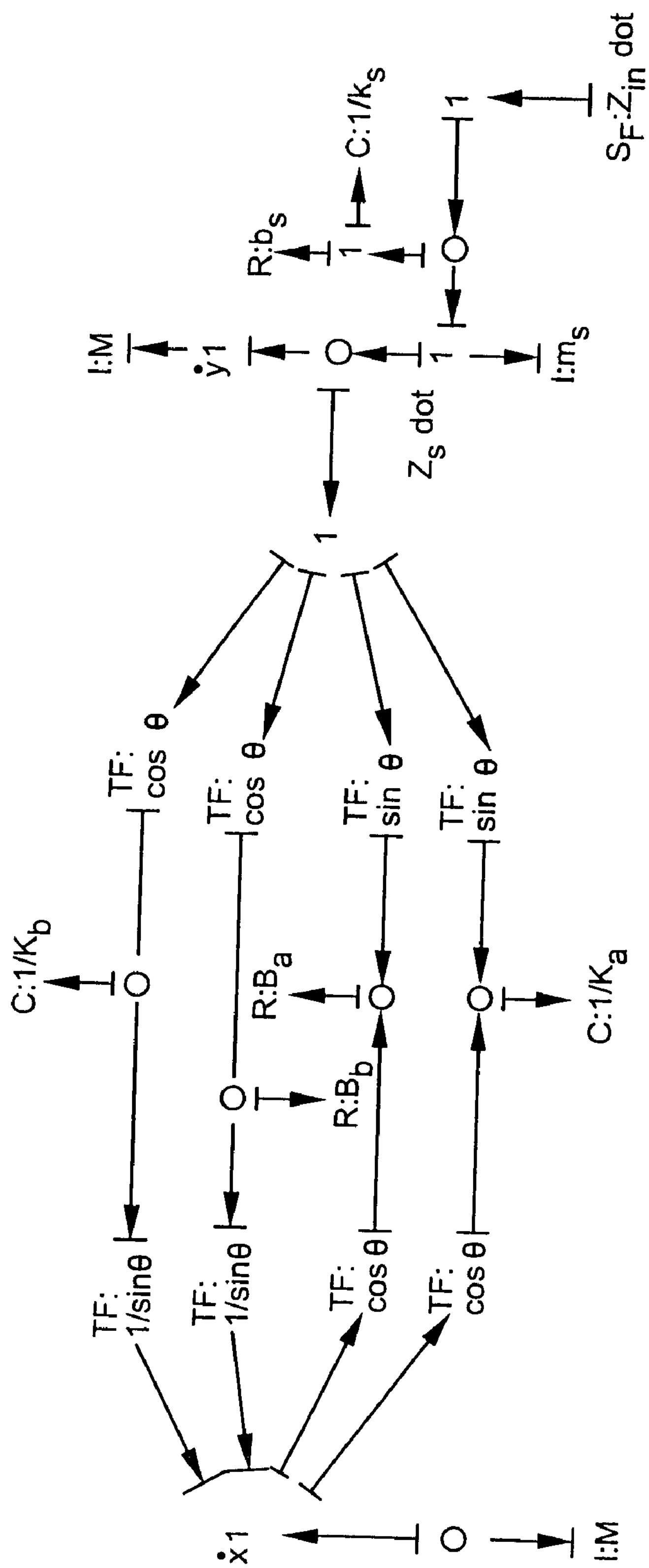
FIG. 22 shows an embodiment of the invention.

To better understand the motion of the mass, M, a bond graph model of the system from FIG. 21 was constructed and is shown in FIG. 22. From this bond graph, the following state equations are derived, $$\dot{P}_s = k_s q_s + b_s\left[\dot{Z}_{in} - \frac{P_s}{m_s}\right] - \dot{P}_y \tag{3.1}$$

$$\dot{P}_y = K_b q_b \cos\theta + \cos\theta\left[B_b\left[\left(\frac{P_s}{m_s} - \frac{P_y}{M}\right)\cos\theta + \frac{P_x}{M}\sin\theta\right]\right] + \sin\theta\left[B_a\left[\left(\frac{P_s}{m_s} - \frac{P_y}{M}\right)\sin\theta - \frac{P_x}{M}\cos\theta\right]\right] + K_a q_a \sin\theta \tag{3.2}$$

$$\dot{P}_x = -K_b q_b \sin\theta - \sin\theta\left[B_b\left[\left(\frac{P_s}{m_s} - \frac{P_y}{M}\right)\cos\theta + \frac{P_x}{M}\sin\theta\right]\right] + \cos\theta\left[B_a\left[\left(\frac{P_s}{m_s} - \frac{P_y}{M}\right)\sin\theta - \frac{P_x}{M}\cos\theta\right]\right] + K_a q_a \cos\theta \tag{3.3}$$

$$\dot{q}_b = \left(\frac{P_s}{m_s} - \frac{P_y}{M}\right)\cos\theta + \frac{P_x}{M}\sin\theta \tag{3.4}$$

$$\dot{q}_a = \left(\frac{P_s}{m_s} - \frac{P_y}{M}\right)\sin\theta - \frac{P_x}{M}\cos\theta \tag{3.5}$$

$$\dot{q}_s = \dot{Z}_{in} - \frac{P_s}{m_s} \tag{3.6}$$

where all of the parameters can be calculated from the non-dimensional and nominal values below:

$$\zeta_a = \frac{B_a}{2\sqrt{K_a M}} = 0.03 \quad \zeta_b = \frac{B_b}{2\sqrt{K_b M}} = 0.3 \quad \zeta_s = \frac{b_s}{2\sqrt{k_s m_s}} = 0.1$$

$$R_\omega = \frac{\omega_b}{\omega_a} = \sqrt{\frac{K_b}{K_a}} = 0.8 \quad \omega_s = \sqrt{\frac{k_s}{m_s}} = \omega_a \quad R_m = \frac{m_s}{M} = 5.0$$

$$M = 1.0\text{ kg} \quad \omega_a = 1.0\text{ Hz}$$

Figure 23:
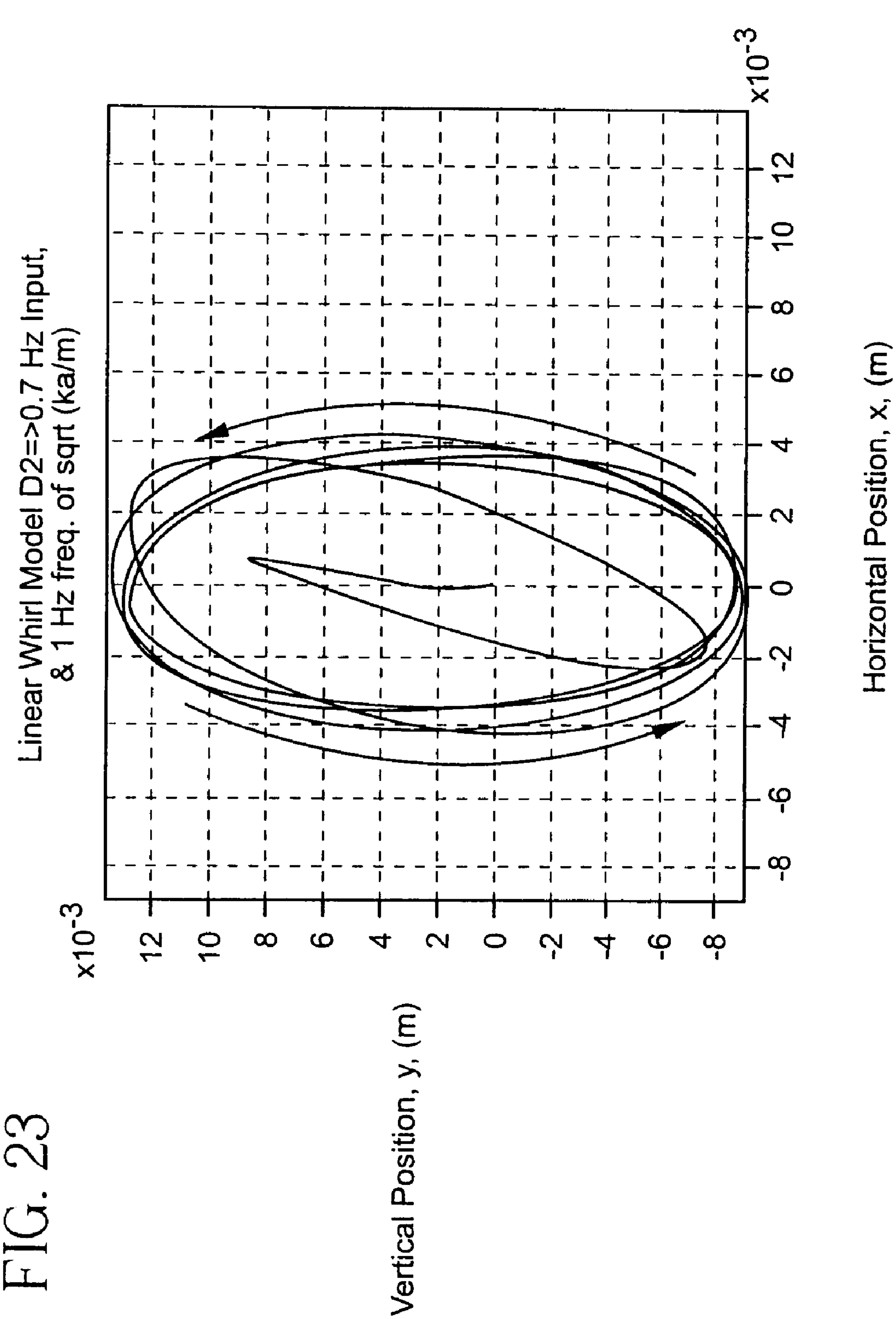
FIG. 23 shows an embodiment of the invention.
Figure 24:
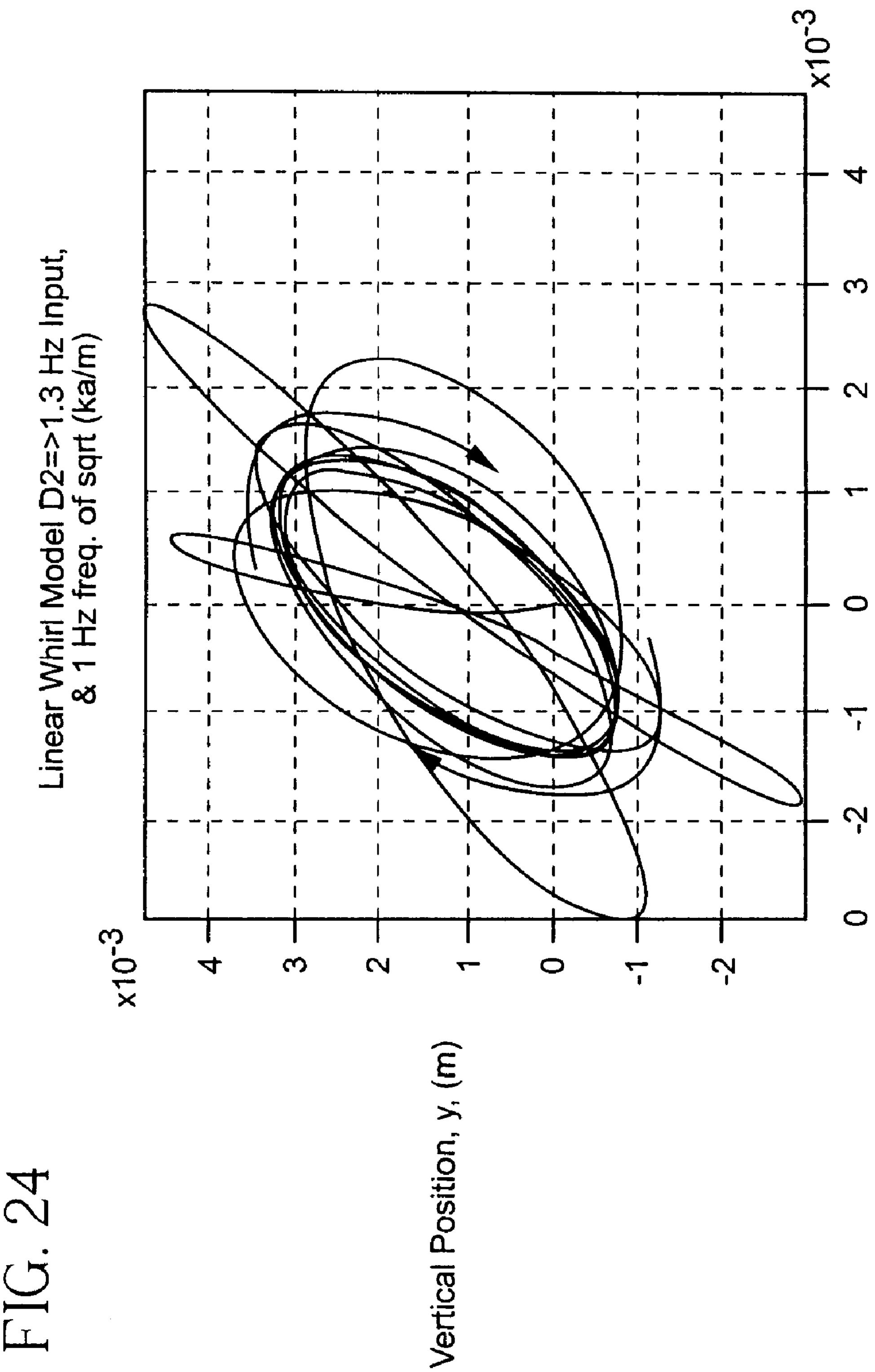
FIG. 24 shows an embodiment of the invention.
Figure 25:
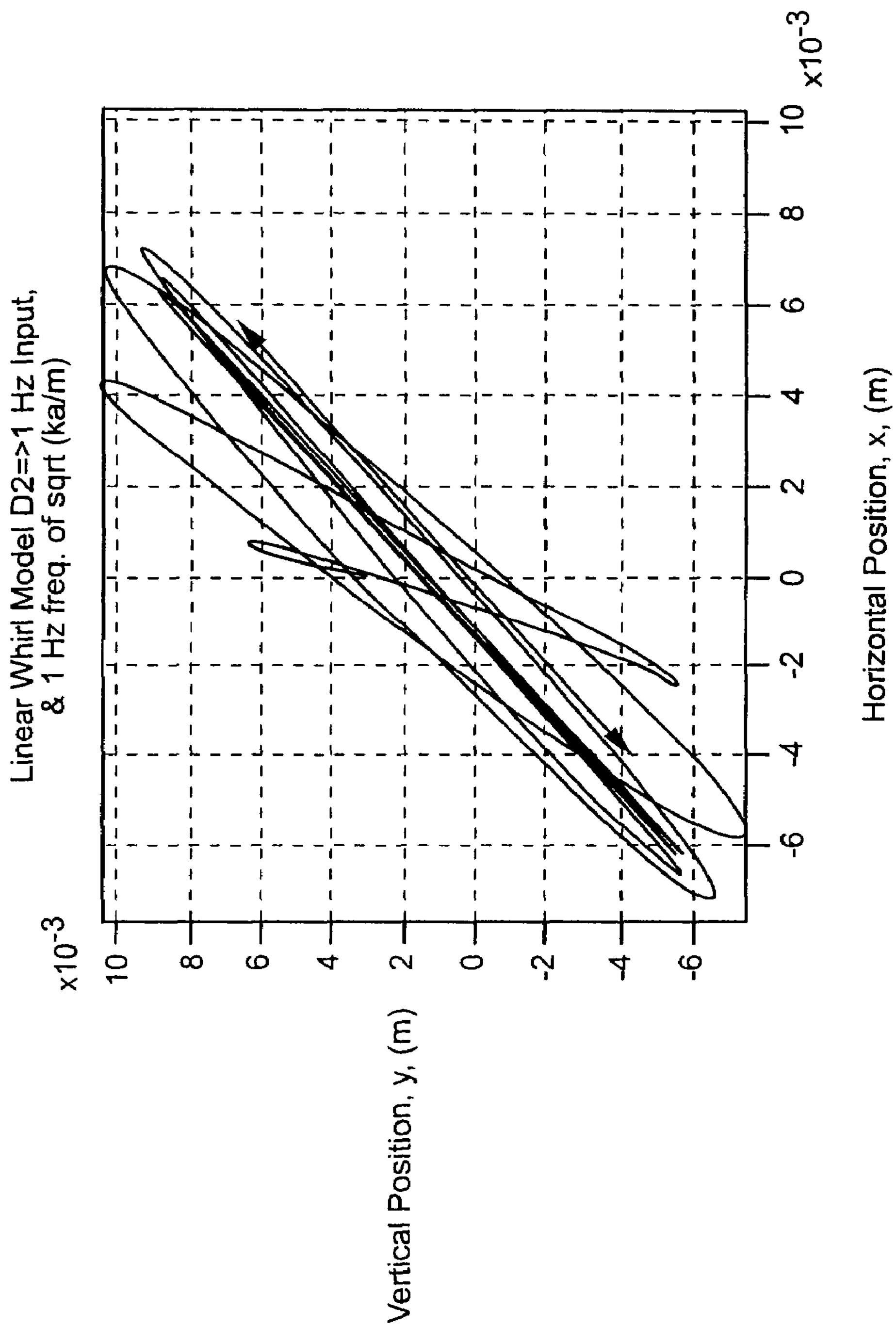
FIG. 25 shows an embodiment of the invention.

These first order state equations were then programmed using Matlab. The results from this model verify the above table. FIGS. 23–25 show how the model responds when the damping constant on the right side is greater than the damping constant on the left side (i.e. when $B_b>B_a$) with the input frequency below resonance. FIG. 23 shows the output from the model for this case. FIG. 24 shows how the mass whirls clockwise when the system is excited above its tuned frequency. FIG. 25 shows how the orbit of the whirling mass collapses to a straight line when the system is excited at its natural frequency. The whirl direction above and below the natural frequency is utilized for the Unidirectional STVA to tune.

When the strut angle, θ, is decreased, the orbits of mass, M become more narrow and vertical. Thus, there is a trade off here, because the more narrow the beam whirling motion, the less easily the mass, M, on the unidirectional STVA will tune, but the more vertical motion will provide for better vibration canceling.

The plot of the phase of the transfer function $$\frac{a}{b}(S)$$

Figure 26:
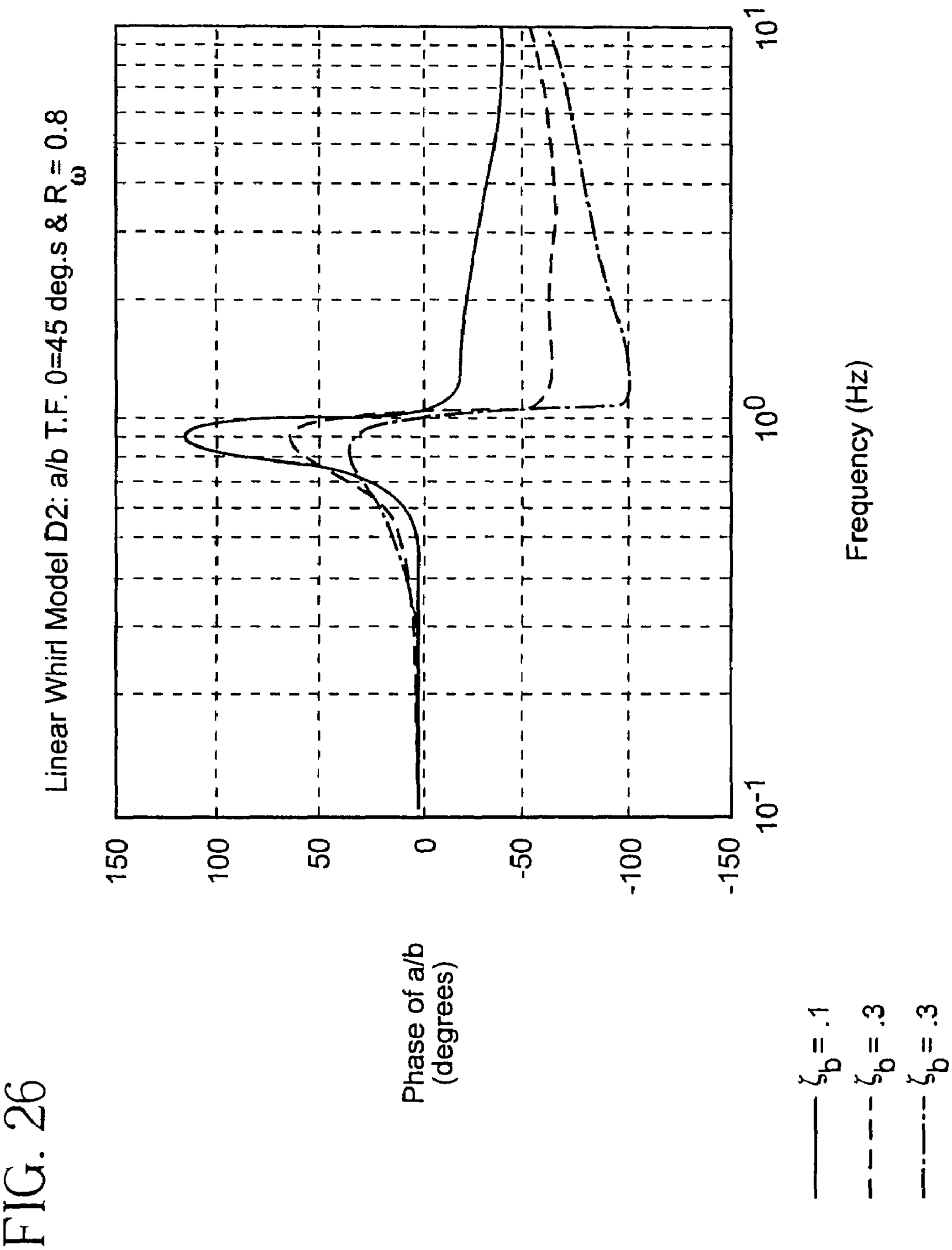
FIG. 26 shows an embodiment of the invention.

(the mass position along the a-axis over the mass position along the b-axis) is shown in FIG. 26. Appropriately, the phase of $$\frac{a}{b}(S)$$

is positive when the system is excited below its natural frequency and the mass is whirling counter-clockwise. Looking above the natural frequency, the phase of $$\frac{a}{b}(S)$$

is negative when the system is excited above its natural frequency and the mass is whirling clockwise. At the natural frequency, the phase of $$\frac{a}{b}(S)$$

is zero and the orbit of the mass collapses to a straight line. On the unidirectional STVA, the whirling action of the beam (the mass in this case) causes a mass, M to move up or down the beam depending on which direction the beam is whirling. This is how the STVA is able to tune itself without any external input of energy. When the orbit of the beam (the mass in this case) collapses in to a straight line, the STVA mass, M, stops moving (or tuning). It is important to note that some asymmetry in spring stiffness (difference in damping ratios) is needed to have the orbit of the beam (the mass in this case) collapse when the STVA mass, M, is at a location such that it gives the STVA a natural frequency which matches the disturbance input frequency, thus canceling and absorbing the varying frequency body vibration.

By making some assumptions about the model parameters, the ideal asymmetry in spring stiffness can be determined. Again, assume that the "a" direction in FIG. 21 is the lightly damped direction (i.e. $B_a$ is close to zero). The natural frequency of this model is going to be very close to $$\sqrt{\frac{K_a}{M}}.$$

Thus, ideally, the orbit should collapse at this point. The orbit collapses when the phase of $$\frac{b}{Z_s}$$

equals the phase of $$\frac{a}{Z_s}$$

where $Z_s$ is the vertical position of the structural mass, $m_s$. At the natural frequency of $$\sqrt{\frac{K_a}{M}},$$

the phase of $$\frac{a}{Z_s}$$

will be $$\frac{-\pi}{2},$$

because of the very light damping in this direction. Therefore, in order for the orbit to collapse at this frequency, the phase of $$\frac{b}{Z_s}$$

must also equal $$\frac{-\pi}{2}.$$

The invention utilizes such asymmetric stiffness and that by setting the phase of $$\frac{b}{Z_s}$$

equal to $$\frac{-\pi}{2},$$

the ideal asymmetric stiffness can be numerically solved for. The below Damping stiffness ratio represents such findings in terms of $R_\omega$ the ratio of the natural frequency in the b-direction, $\omega_b$, to the natural frequency in the a-direction, $\omega_a$.

where $\zeta_a = \frac{B_a}{2\sqrt{K_a M}}$, $\zeta_b = \frac{B_b}{2\sqrt{K_b M}}$ and $R_\omega = \frac{\omega_b}{\omega_a} = \sqrt{\frac{K_b}{K_a}}$ as before.

To verify the results one only needs to look as far as FIG. 26 where the system has a stiffness ratio, $R_\omega$ of 0.8. From the above Table, the ideal damping ratio in the b-direction, $\zeta_b$ for this system is 0.3. FIG. 26 clearly shows that when $\zeta_b$ is 0.3, the phase of the transfer function a/b is zero right at 1 Hz, the natural frequency of the system. The other damping ratios in FIG. 26 fall just to either side of this ideal.

The whirl direction has been shown to rely on two important factors: one, whether the device is being shaken below or above its natural frequency, and two, whether the damping constant on the left or the right is greater. It has been shown that a certain amount of asymmetric stiffness is needed to collapse the orbit at the natural frequency of the device. Third, with the model derived in this section, it can be shown that a smaller strut angle results in a whirling motion that is more narrow and vertical. While this could be useful in reducing the amount of effective damping of the STVA, the more narrow orbit reduces motivation of the mass, M.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A mechanical self-tuning vibration absorber system for a variable vibrating body having a body vibration with a varying frequency, said body vibration having a vibration direction, said mechanical self-tuning vibration absorber system attached to said variable vibrating body, said mechanical self-tuning vibration absorber system having a first absorber unit with a first damping ratio and a second absorber unit with a second damping ratio, said second absorber second damping ratio different from said first absorber first damping ratio, said first absorber unit connected to said second absorber unit wherein said connected first absorber unit and said second absorber unit mechanically walk in a first tuning direction to a low tuned position when said variable vibrating body vibration varying frequency changes to a lower frequency, said first tuning direction perpendicular to said vibration direction, and in a second tuning direction to a high tuned position when said variable vibrating body vibration varying frequency changes to a higher frequency, said second tuning direction perpendicular to said vibration direction.

2. A mechanical self-tuning vibration absorber system as claimed in claim 1 wherein said first damping ratio is greater than said second damping ratio.

3. A mechanical self-tuning vibration absorber system as claimed in claim 1 wherein said mechanical self-tuning vibration absorber system is attached to said variable vibrating body with a mechanical self-tuning vibration absorber system base and said connected first absorber unit and said second absorber unit mechanically walk along a vibration absorber system longitudinal track, said longitudinal track secured proximate to said vibration absorber system base with said first tuning direction away from said base and along said longitudinal beam and said second tuning direction toward said base along said longitudinal beam.

4. A mechanical self-tuning vibration absorber system as claimed in claim 3 wherein an interaction between said first absorber unit and said second absorber unit relative to said lower frequency and a difference between said first damping ratio and said second damping ratio drives said connected first absorber unit and said second absorber unit away from said base.

5. A mechanical self-tuning vibration absorber system as claimed in claim 3 wherein an interaction between said first absorber unit and said second absorber unit relative to said higher frequency and a difference between said first damping ratio and said second damping ratio drives said connected first absorber unit and said second absorber unit towards said base.

6. A mechanical self-tuning vibration absorber system as claimed in claim 1 wherein said first absorber unit has a resonant frequency within the range of body vibration varying frequency.

7. A mechanical self-tuning vibration absorber system as claimed in claim 1 wherein said second absorber unit has a resonant frequency within the range of body vibration varying frequency.

8. A mechanical self-tuning vibration absorber system as claimed in claim 3 wherein said connected first absorber unit and said second absorber unit are comprised of a friction interaction surface, said friction interaction surface movably contacting said vibration absorber system longitudinal track.

9. A method of absorbing vibrations, said method comprising providing a variable vibrating body having a body vibration with a varying frequency, said body vibration having a vibration direction, providing a mechanical self-tuning vibration absorber system with a mechanical self-tuning vibration absorber system base and a mechanical vibration absorber system longitudinal track, said mechanical self-tuning vibration absorber system including a first absorber unit with a first damping ratio and a second absorber unit with a second damping ratio, said second absorber second damping ratio different from said first absorber first damping ratio, said first absorber unit mechanically connected to said second absorber unit, said connected first absorber unit and said second absorber unit movably connected to said mechanical vibration absorber system longitudinal track, attaching said mechanical self-tuning vibration absorber system to said provided body wherein said connected first absorber unit and said second absorber unit mechanically walk in a first tuning direction to a low tuned position when said variable vibrating body vibration varying frequency changes to a lower frequency, said first tuning direction perpendicular to said vibration direction, and in a second tuning direction to a high tuned position when said variable vibrating body vibration varying frequency changes to a higher frequency, said second tuning direction perpendicular to said vibration direction.

10. A method of absorbing vibrations as claimed in claim 9 wherein said first damping ratio is greater than said second damping ratio.

11. A method of absorbing vibrations as claimed in claim 9 wherein said mechanical vibration absorber system longitudinal track is secured proximate to said mechanical self-tuning vibration absorber system base, and attaching said mechanical self-tuning vibration absorber system to said provided body includes attaching said mechanical self-tuning vibration absorber system base to said provided body, with said first tuning direction away from said base and along said longitudinal track and said second tuning direction toward said base along said longitudinal track.

12. A method of absorbing vibrations as claimed in claim 11 wherein an asymmetrical damping phase difference interaction between said first absorber unit and said second absorber unit relative to said lower frequency drives said connected first absorber unit and said second absorber unit away from said base.

13. A method of absorbing vibrations as claimed in claim 11 wherein an asymmetrical damping phase difference interaction between said first absorber unit and said second absorber unit relative to said higher frequency drives said connected first absorber unit and said second absorber unit towards said base.

14. A method of absorbing vibrations as claimed in claim 9 wherein said first absorber unit has a resonance frequency within the range of the body vibration varying frequency.

15. A method of absorbing vibrations as claimed in claim 9 wherein said second absorber unit has a resonance frequency within the range of the body vibration varying frequency.

16. A method of absorbing vibrations as claimed in claim 9 wherein said connected first absorber unit and said second absorber unit include a friction interaction surface, said friction interaction surface movably contacting said track with a walking interaction.

17. A method of making a mechanical self-tuning vibration absorber system for a vibration having a vibration direction, comprising: providing a mechanical vibration absorber system longitudinal track oriented perpendicular to said vibration direction, providing a first absorber unit with a first damping ratio and a second absorber unit with a second damping ratio, said second absorber second damping ratio different from said first absorber first damping ratio, said first absorber unit connected to said second absorber unit, movably mounting said first absorber unit and said second absorber unit to said mechanical vibration absorber system longitudinal track, wherein said connected first absorber unit and said second absorber unit mechanically walk in a first tuning direction to a low tuned position when excited by a variable vibrating body vibration varying frequency which changes to a lower frequency, said first tuning direction perpendicular to said vibration direction, and in a second tuning opposing direction to a high tuned position when excited by a variable vibrating body vibration varying frequency which changes to a higher frequency, said second tuning direction perpendicular to said vibration direction.

18. A method as claimed in claim 17 wherein said first damping ratio is greater than said second damping ratio.

19. A method as claimed in claim 17, said method including providing a mechanical vibration absorber system base, securing said mechanical vibration absorber system longitudinal track to said mechanical self-tuning vibration absorber system base wherein said first tuning direction is away from said base and along said longitudinal track and said second tuning direction is toward said base along said longitudinal track.

20. A method as claimed in claim 17, wherein an asymmetrical damping phase difference interaction between said first absorber unit and said second absorber unit relative to the vibration frequency drives said connected first absorber unit and said second absorber unit.

21. A method as claimed in claim 17, wherein said first absorber unit has a resonance relative frequency within the range of the body vibration varying frequency and said second absorber unit has a resonance relative frequency within the range of the body vibration varying frequency.

22. A method as claimed in claim 17, wherein said connected first absorber unit and said second absorber unit include a friction interaction surface, said friction interaction surface movably contacting said track with a walking interaction.

23. A method of tracking vibration frequency of a vibrating body having a vibration direction, said method comprising providing a mechanical self-tuning vibration absorber system, said mechanical self-tuning vibration absorber system having a first absorber unit with a first damping ratio and a second absorber unit with a second damping ratio, said second absorber second damping ratio different from said first absorber first damping ratio, said first absorber unit connected to said second absorber unit wherein said connected first absorber unit and said second absorber unit mechanically walk in a first tuning direction to a low tuned position when excited by a variable vibrating body vibration varying frequency changing to a lower frequency, said first tuning direction perpendicular to said vibration direction, and in a second tuning direction to a high tuned position when exposed to a variable vibrating body vibration varying frequency changing to a higher frequency, said second tuning direction perpendicular to said vibration direction, attaching said mechanical self-tuning vibration absorber system to said vibrating body with said first tuning direction and said second tuning direction perpendicular to said vibration direction and observing a position of said connected first absorber unit and said second absorber.

24. A method as claimed in claim 23, said method including monitoring a positional change of said connected first absorber unit and said second absorber.

25. A method as claimed in claim 23, wherein said connected first absorber unit and said second absorber walk along a longitudinal track, said longitudinal track including a plurality of measurement marks.

26. A method as claimed in claim 25, wherein said connected first absorber unit and said second absorber unit include a friction interaction surface, said friction interaction surface movably contacting said track with a walking interaction.

27. A vehicle, said vehicle comprised of a variable vibrating body, said body having a body vibration with a varying frequency, said body vibration having a vibration direction, said body including a mechanical self-tuning vibration absorber system having a first absorber unit with a first damping ratio and a second absorber unit with a second damping ratio, said second absorber second damping ratio different from said first absorber first damping ratio, said first absorber unit connected to said second absorber unit wherein said connected first absorber unit and said second absorber unit mechanically walk in a first tuning direction to a low tuned position when said variable vibrating body vibration varying frequency changes to a lower frequency, said first tuning direction perpendicular to said vibration direction, and in a second tuning direction to a high tuned position when said variable vibrating body vibration varying frequency changes to a higher frequency, said second tuning direction perpendicular to said vibration direction.

28. A vehicle as claimed in claim 27, wherein said first damping ratio is greater than said second damping ratio.

29. A vehicle as claimed in claim 27, wherein said mechanical self-tuning vibration absorber system is attached to said body with a mechanical self-tuning vibration absorber system base and said connected first absorber unit and said second absorber unit mechanically walk along a vibration absorber system longitudinal track, said longitudinal track secured proximate to said vibration absorber system base with said first tuning direction away from said base and along said longitudinal track and said second tuning direction toward said base along said longitudinal track.

30. A vehicle as claimed in claim 27, wherein an asymmetrical damping phase difference interaction between said first absorber unit and said second absorber unit relative to said lower frequency drives said connected first absorber unit and said second absorber unit in said first direction.

31. A vehicle as claimed in claim 27, wherein an asymmetrical damping phase difference interaction between said first absorber unit and said second absorber unit relative to said higher frequency drives said connected first absorber unit and said second absorber unit in said second direction.

32. A vehicle as claimed in claim 27, wherein said first absorber unit has a resonance frequency within the range of body vibration varying frequency and said second absorber unit has a resonance frequency within the range of body vibration varying frequency.

33. A helicopter comprised of a variable vibrating body, said body having a body vibration with a varying frequency, said body vibration having a vibration direction, said body including a mechanical self-tuning vibration absorber system having a longitudinal track and a first absorber unit with a first damping ratio and a second absorber unit with a second damping ratio, said second absorber second damping ratio different from said first absorber first damping ratio, said first absorber unit connected to said second absorber unit wherein said connected first absorber unit and said second absorber unit mechanically walk along said longitudinal track in a first tuning direction to a low tuned position when said variable vibrating body vibration varying frequency changes to a lower frequency, said first tuning direction perpendicular to said vibration direction, and in a second tuning direction to a high tuned position when said variable vibrating body vibration varying frequency changes to a higher frequency, said second tuning direction perpendicular to said vibration direction.

34. A helicopter as claimed in claim 33, wherein said first damping ratio is greater than said second damping ratio and said first absorber unit has a resonance relative frequency within the range of body vibration varying frequency and said second absorber unit has a resonance relative frequency within the range of body vibration varying frequency.

35. A helicopter as claimed in claim 33, wherein an asymmetrical damping phase difference interaction between said first absorber unit and said second absorber unit relative to said frequency drives said connected first absorber unit and said second absorber unit.

36. A method of absorbing vehicle vibrations, said method comprising providing a variable vibrating vehicle body having a body vibration with a varying frequency, said varying frequency in the range of 1–1,000 Hz, said body vibration having a vibration direction, providing a mechanical self-tuning vibration absorber system with a mechanical self-tuning vibration absorber system base and a mechanical vibration absorber system longitudinal track, said mechanical self-tuning vibration absorber system including a first absorber unit with a first damping ratio and a second absorber unit with a second damping ratio, said second absorber second damping ratio different from said first absorber first damping ratio, said first absorber unit mechanically connected to said second absorber unit, said connected first absorber unit and said second absorber unit movably connected to said mechanical vibration absorber system longitudinal track, attaching said mechanical self-tuning vibration absorber system to said provided vehicle body wherein said connected first absorber unit and said second absorber unit mechanically walk along said longitudinal track in a first tuning direction to a low tuned position when said variable vibrating body vibration varying frequency changes to a lower frequency, said first tuning direction perpendicular to said vibration direction, and in a second tuning direction to a high tuned position when said variable vibrating body vibration varying frequency changes to a higher frequency, said second tuning direction perpendicular to said vibration direction.

37. A method as claimed in claim 36, wherein said connected first absorber unit and said second absorber unit include a friction interaction surface, said friction interaction surface movably contacting said track with a walking interaction.

38. A mechanical self-tuning vibration absorber, said mechanical self-tuning vibration absorber for attachment to a vibrating body having a vibration direction, said mechanical self-tuning vibration absorber having a damped first absorber unit with a first damping ratio and an undamped second absorber unit with a second damping ratio, said undamped second absorber second damping ratio different from said damped first absorber first damping ratio, said damped first absorber unit connected to said undamped second absorber unit wherein said connected damped first absorber unit and said undamped second absorber unit mechanically walk in a first tuning direction to a low tuned position said first tuning direction perpendicular to said vibration direction, and in a second tuning direction to a high tuned position, said second tuning direction perpendicular to said vibration direction.

39. A method of absorbing vibrations, said method comprising the steps of providing a body having a body vibration, said body vibration having a vibration direction, providing a mechanical self-tuning vibration absorber with a mechanical vibration absorber longitudinal track, said mechanical self-tuning vibration absorber including a first absorber unit with a first damping ratio and a second absorber unit with a second damping ratio, said second absorber second damping ratio different from said first absorber first damping ratio, said first absorber unit mechanically connected to said second absorber unit, said connected first absorber unit and said second absorber unit movably connected to said mechanical vibration absorber longitudinal track, attaching said mechanical self-tuning vibration absorber to said provided body wherein said connected first absorber unit and said second absorber unit mechanically walk in a first tuning direction to a low tuned position, said first tuning direction perpendicular to said vibration direction, and in a second tuning direction to a high tuned position, said second tuning direction perpendicular to said vibration direction.

40. A vehicle, said vehicle comprised of a vibrating body, said body having a body vibration with a frequency, said body vibration having a vibration direction, said body including a mechanical self-tuning vibration absorber having a first absorber unit with a first damping ratio and a second absorber unit with a second damping ratio, said second absorber second damping ratio different from said first absorber first damping ratio, said first absorber unit connected to said second absorber unit wherein said connected first absorber unit and said second absorber unit mechanically walk in a first tuning direction to a low tuned position, said first tuning direction perpendicular to said vibration direction, and in a second tuning direction to a high tuned position, said second tuning direction perpendicular to said vibration direction.

41. A helicopter, said helicopter having a vibration direction and including a mechanical self-tuning vibration absorber having a longitudinal track and a damped first absorber unit and an undamped second absorber unit, said damped first absorber unit connected to said undamped second absorber unit wherein said connected damped first absorber unit and said undamped second absorber unit mechanically walk along said longitudinal track in a first tuning direction to a low tuned position, said first tuning direction perpendicular to said vibration direction, and in an opposing second tuning direction to a high tuned position, said second tuning direction perpendicular to said vibration direction.

42. A method of absorbing vehicle vibrations, said method comprising the steps of providing a vibrating vehicle body having a vibration direction, providing a mechanical self-tuning vibration absorber with a mechanical vibration absorber longitudinal track, said mechanical self-tuning vibration absorber including a damped absorber unit and an undamped absorber unit, said damped absorber unit connected to said undamped absorber unit, said connected damped absorber unit and said undamped absorber unit connected to said mechanical vibration absorber longitudinal track, attaching said mechanical self-tuning vibration absorber to said provided vehicle body wherein said connected damped absorber unit and said undamped absorber unit walk along said longitudinal track in a first tuning direction to a low tuned position, said first tuning direction perpendicular to said vibration direction, and in an opposing second tuning direction to a high tuned position, said second tuning direction perpendicular to said vibration direction.

* * * * *